United States Patent
Wang et al.

(10) Patent No.: US 10,298,502 B2
(45) Date of Patent: May 21, 2019

(54) METHOD, DEVICE, AND SYSTEM FOR PERFORMING BALANCE ADJUSTMENT ON EGRESS TRAFFIC OF SDN BASED IDC NETWORK

(71) Applicant: Huawei Technologies Co., Ltd., Shenzhen, Guangdong (CN)

(72) Inventors: Yining Wang, Shenzhen (CN); Yaowu Pan, Shenzhen (CN); Guoquan Wu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 40 days.

(21) Appl. No.: 15/723,035

(22) Filed: Oct. 2, 2017

(65) Prior Publication Data
US 2018/0026895 A1 Jan. 25, 2018

Related U.S. Application Data

(63) Continuation of application No. PCT/CN2015/094981, filed on Nov. 19, 2015.

(30) Foreign Application Priority Data

Apr. 3, 2015 (CN) .......................... 2015 1 0157675

(51) Int. Cl.
*H04L 12/813* (2013.01)
*H04L 12/24* (2006.01)
(Continued)

(52) U.S. Cl.
CPC .......... *H04L 47/20* (2013.01); *H04L 41/0893* (2013.01); *H04L 41/142* (2013.01);
(Continued)

(58) Field of Classification Search
CPC ... H04L 47/20; H04L 41/0893; H04L 41/142; H04L 41/20; H04L 67/1097; H04L 67/34; H04L 43/04; H04L 43/062; H04L 43/0876

See application file for complete search history.

(56) References Cited

U.S. PATENT DOCUMENTS 9,178,807 B1 * 11/2015 Chua ...................... H04L 45/02
9,699,116 B2 * 7/2017 Zhang ..................... H04L 49/35
(Continued)

FOREIGN PATENT DOCUMENTS

CN   102984064 A   3/2013
CN   103259739 A   8/2013
(Continued)

OTHER PUBLICATIONS

Decoupling Policy from Routing with Software Defined Interdomain Management, Peter Thai & J. C de Olivera , IEEE (Year: 2013).*
(Continued)

*Primary Examiner* — Habte Mered

(57) ABSTRACT

A method, a device, and a system for performing balance adjustment on egress traffic of an SDN-based IDC network are disclosed, to resolve a technical problem that balance adjustment cannot be performed on egress traffic of an IDC network. The method includes: sending group information of at least one AS group to an SDN controller, where the group information is used by the SDN controller to generate an AS filtering policy and deliver the AS filtering policy to a DPE; obtaining AS traffic information that is obtained by the DPE through statistics collection according to the AS filtering policy; generating a traffic adjustment policy according to the AS traffic information, where the traffic adjustment policy is used to instruct to adjust traffic of a
(Continued)

destination AS group to a destination egress link; and sending the traffic adjustment policy to the SDN controller.

18 Claims, 14 Drawing Sheets

(51) Int. Cl.
*H04L 29/08* (2006.01)
*H04L 12/26* (2006.01)

(52) U.S. Cl.
CPC .......... *H04L 41/20* (2013.01); *H04L 67/1097* (2013.01); *H04L 67/34* (2013.01); *H04L 43/04* (2013.01); *H04L 43/062* (2013.01); *H04L 43/0876* (2013.01)

(56) References Cited

U.S. PATENT DOCUMENTS

| | | | |
|---|---|---|---|
| 9,787,559 B1* | 10/2017 | Schroeder | H04L 41/5038 |
| 9,960,958 B2* | 5/2018 | Ramachandran | H04L 63/061 |
| 2013/0223226 A1* | 8/2013 | Narayanan | H04L 45/308 |
| | | | 370/236 |
| 2013/0318243 A1* | 11/2013 | Chinthalapati | H04L 45/24 |
| | | | 709/226 |
| 2014/0089500 A1* | 3/2014 | Sankar | H04L 47/125 |
| | | | 709/224 |
| 2014/0089506 A1 | 3/2014 | Puttaswamy Naga et al. | |
| 2014/0237118 A1 | 8/2014 | Matthews | |
| 2015/0074264 A1* | 3/2015 | Izhak-Ratzin | G06F 17/30194 |
| | | | 709/224 |
| 2015/0312117 A1* | 10/2015 | Behera | H04L 43/04 |
| | | | 370/241 |
| 2015/0358235 A1* | 12/2015 | Zhang | H04L 45/745 |
| | | | 370/230 |
| 2016/0112270 A1* | 4/2016 | Danait | H04L 41/142 |
| | | | 709/220 |
| 2016/0205598 A1* | 7/2016 | Tian | H04W 48/08 |
| | | | 370/331 |
| 2016/0308905 A1* | 10/2016 | Stiekes | H04L 47/20 |

FOREIGN PATENT DOCUMENTS

| | | |
|---|---|---|
| CN | 103905523 A | 7/2014 |
| CN | 104796348 A | 7/2015 |

OTHER PUBLICATIONS

Joseph et al.; "A Policy-aware Switching Layer for Data Centers"; SIGCOMM '08; Aug. 17-22, 2008; Seattle, Washington, USA; 12 pages.

* cited by examiner

METHOD, DEVICE, AND SYSTEM FOR PERFORMING BALANCE ADJUSTMENT ON EGRESS TRAFFIC OF SDN BASED IDC NETWORK

CROSS-REFERENCE TO RELATED APPLICATIONS

This application is a continuation of International Application No. PCT/CN2015/094981, filed on Nov. 19, 2015, which claims priority to Chinese Patent Application No. 201510157675.1, filed on Apr. 3, 2015. The disclosures of the aforementioned applications are hereby incorporated by reference in their entireties.

TECHNICAL FIELD

The present application relates to the field of communications technologies, and in particular, to a method, a device, and a system for performing balance adjustment on egress traffic of an SDN-based IDC network.

BACKGROUND

In a cloud computing era, a data center (DC) network faces many challenges. In a conventional IDC (Internet data center) network, a network and a service are separated. Because of the separation of a network and a service, the conventional IDC network is manually configured by an administrator by using a command line or by a network management system, and is a static network. Therefore, service deployment efficiency is low, and dynamic adjustment cannot be implemented. Moreover, because of the separation of a network and a service, the conventional IDC network is hard to be customized and a long adjustment period, and therefore years of feature and architecture adjustment and introduction of a new device are usually required to satisfy a new service.

It is found through practice that, introduction of an SDN (software-defined networking) technology into the IDC network helps resolve the foregoing problem. SDN is a new-type network architecture, and its design philosophy is to separate a control plane of a network from a data forwarding plane of the network, and implement programmable control. An SDN-based IDC network (SDN IDC network) can improve service deployment efficiency, enhance a customization capability, and shorten an adjustment period.

In the SDN-based IDC network, traffic control is performed by using an SDN controller. However, due to the lack of an effective adjustment method, in an existing network, only blind adjustment without a basis or adjustment according to only experience can be performed. Therefore, precision and real-time performance are poor, and balance adjustment cannot be performed on egress traffic of the IDC network.

SUMMARY

Embodiments of the present disclosure provide a method, a device, and a system for performing balance adjustment on egress traffic of an SDN-based IDC network, to resolve a technical problem that balance adjustment cannot be performed on egress traffic of an IDC network because precision and real-time performance of an existing traffic adjustment technology are poor.

A first aspect of the present disclosure provides a method for performing balance adjustment on egress traffic of an SDN-based IDC network, where the IDC network includes: a data center provider edge DPE, a traffic analysis device and an SDN controller that are connected to the DPE, and a policy management device connected to the traffic analysis device and the SDN controller; and the DPE is connected to multiple core network provider edges CPEs in a public network by using multiple egress links, where the method includes: sending, by the policy management device, group information of at least one autonomous system AS group to the SDN controller, where the group information is used by the SDN controller to generate an AS filtering policy and deliver the AS filtering policy to the DPE, and each AS group in the at least one AS group includes one or more ASs; obtaining, by using the traffic analysis device, AS traffic information that is obtained by the DPE through statistics collection according to the AS filtering policy, where the AS traffic information includes: information about traffic of an AS group that flows through the multiple egress links from the DPE to the multiple CPEs; generating a traffic adjustment policy according to the AS traffic information, where the traffic adjustment policy is used to instruct to adjust traffic of at least one destination AS group in the at least one AS group to at least one destination egress link in the multiple egress links; and sending the traffic adjustment policy to the SDN controller, where the traffic adjustment policy is used by the SDN controller to control the DPE to adjust egress traffic.

With reference to the first aspect, in a first possible implementation manner, the generating a traffic adjustment policy according to the AS traffic information includes: displaying the AS traffic information to a system user; receiving AS traffic adjustment information entered by the system user; and converting the AS traffic adjustment information into the traffic adjustment policy.

With reference to the first aspect, in a second possible implementation manner, the generating a traffic adjustment policy according to the AS traffic information includes: analyzing the AS traffic information by using a preset policy rule, and generating the corresponding traffic adjustment policy.

With reference to the second possible implementation manner of the first aspect, in a third possible implementation manner, the analyzing the AS traffic information by using a preset policy rule, and generating the corresponding traffic adjustment policy includes: calculating link bandwidth utilizations of the multiple egress links according to the AS traffic information; finding an overloaded egress link whose link bandwidth utilization is greater than a first threshold that is set in the policy rule, and an underloaded egress link whose link bandwidth utilization is less than a second threshold that is set in the policy rule; selecting traffic of a destination AS group from traffic of all AS groups on the overloaded egress link, and selecting a destination egress link from the underloaded egress link; and generating the corresponding traffic adjustment policy, where the traffic adjustment policy is used to instruct to adjust the traffic of the destination AS group to the destination egress link.

With reference to the first aspect or any one of the first to third possible implementation manners of the first aspect, in a fourth possible implementation manner, after the sending the traffic adjustment policy to the SDN controller, the method further includes: sending, by the policy management device, VIP information to the traffic analysis device, and receiving information about an elephant flow and reported by the traffic analysis device, where the elephant flow is traffic, of first N Internet protocol IP network segments with maximum traffic, obtained by the traffic analysis device by filtering out VIP traffic flowing through an IP network segment of a network egress and indicated by the VIP information from a traffic statistics packet reported by the DPE, and then converging and sequencing remaining traffic in the traffic statistics packet according to destination prefixes, where N is a positive integer; converting the information about the elephant flow into an access control list ACL statistics rule, and sending the ACL statistics rule to the SDN controller, where the ACL statistics rule is used by the SDN controller to generate an ACL policy and deliver the ACL policy to the DPE; obtaining, by using the traffic analysis device, ACL traffic information that is obtained by the DPE through statistics collection according to the ACL policy, where the ACL traffic information includes: information about ACL traffic that flows through the multiple egress links from the DPE to the multiple CPEs; and sending the ACL traffic information to the SDN controller, where the ACL traffic information is analyzed by the SDN controller according to a preset adjustment rule to find an egress link and traffic that need to be adjusted and control the DPE to adjust egress traffic.

A second aspect of the present disclosure provides a method for performing balance adjustment on egress traffic of an SDN-based IDC network, where the IDC network includes: a data center provider edge DPE, a traffic analysis device and an SDN controller that are connected to the DPE, and a policy management device connected to the traffic analysis device and the SDN controller; and the DPE is connected to multiple core network provider edges CPEs in a public network by using multiple egress links, where the method includes: receiving, by the SDN controller, group information of at least one autonomous system AS group sent by the policy management device, where each AS group in the at least one AS group includes one or more ASs; generating an AS filtering policy according to the group information and delivering the AS filtering policy to the DPE, where the AS filtering policy is used by the DPE to collect statistics to obtain AS traffic information, and the AS traffic information includes: information about traffic of an AS group that flows through the multiple egress links from the DPE to the multiple CPEs; receiving a traffic adjustment policy sent by the policy management device, where the traffic adjustment policy is generated by the policy management device after the policy management device obtains the AS traffic information by using the traffic analysis device, and the traffic adjustment policy is used to instruct to adjust traffic of at least one destination AS group in the at least one AS group to at least one destination egress link in the multiple egress links; and controlling, according to the traffic adjustment policy, the DPE to adjust egress traffic.

With reference to the second aspect, in a first possible implementation manner, after the controlling, according to the traffic adjustment policy, the DPE to adjust egress traffic, the method further includes: receiving an ACL statistics rule sent by the policy management device, and generating an ACL policy and delivering the ACL policy to the DPE, where the ACL policy is used by the DPE to collect statistics to obtain ACL traffic information, and the ACL traffic information includes: information about ACL traffic that flows through the multiple links from the DPE to the multiple CPEs; and obtaining, by using the traffic analysis device, ACL traffic information that is obtained by the DPE through statistics collection, and analyzing the ACL traffic information by using a preset adjustment rule, to find an egress link and traffic that need to be adjusted and control the DPE to adjust egress traffic.

A third aspect of the present disclosure provides a method for performing balance adjustment on egress traffic of an SDN-based IDC network, where the IDC network includes: a data center provider edge DPE, a traffic analysis device and an SDN controller that are connected to the DPE, and a policy management device connected to the traffic analysis device and the SDN controller; and the DPE is connected to multiple core network provider edges CPEs in a public network by using multiple egress links, where the method includes: sending, by the policy management device, VIP information to the traffic analysis device, and receiving information about an elephant flow and reported by the traffic analysis device, where the elephant flow is traffic, of first N Internet protocol IP network segments with maximum traffic, obtained by the traffic analysis device by filtering out VIP traffic flowing through an IP network segment of a network egress and indicated by the VIP information from a traffic statistics packet reported by the DPE, and then converging and sequencing remaining traffic in the traffic statistics packet according to destination prefixes, where N is a positive integer; converting the information about the elephant flow into an access control list ACL statistics rule, and sending the ACL statistics rule to the SDN controller, where the ACL statistics rule is used by the SDN controller to generate an ACL policy and deliver the ACL policy to the DPE; obtaining, by using the traffic analysis device, ACL traffic information that is obtained by the DPE through statistics collection according to the ACL policy, where the ACL traffic information includes: information about ACL traffic that flows through the multiple egress links from the DPE to the multiple CPEs; and sending the ACL traffic information to the SDN controller, where the ACL traffic information is analyzed by the SDN controller according to a preset adjustment rule to find an egress link and traffic that need to be adjusted and control the DPE to adjust egress traffic.

A fourth aspect of the present disclosure provides a method for performing balance adjustment on egress traffic of an SDN-based IDC network, where the IDC network includes: a data center provider edge DPE, a traffic analysis device and an SDN controller that are connected to the DPE, and a policy management device connected to the traffic analysis device and the SDN controller; and the DPE is connected to multiple core network provider edges CPEs in a public network by using multiple egress links, where the method includes: receiving, by the traffic analysis device, a traffic statistics packet reported by the DPE; receiving, by the traffic analysis device, VIP information sent by the policy management device, and filtering out VIP traffic flowing through an IP network segment of a network egress and indicated by the VIP information from the traffic statistics packet reported by the DPE, and then converging and sequencing remaining traffic in the traffic statistics packet according to destination prefixes, to obtain traffic of first N Internet protocol IP network segments with maximum traffic, where N is a positive integer, and the traffic of the first N IP network segments with maximum traffic is referred to as an elephant flow; sending, by the traffic analysis device, information about the elephant flow to the policy management device, where the information about the elephant flow is converted by the policy management device into an access control list ACL statistics rule to be sent to the SDN controller, and the ACL statistics rule is used by the SDN controller to generate an ACL policy and deliver the ACL policy to the DPE; obtaining, by the traffic analysis device, ACL traffic information that is obtained by the DPE through statistics collection according to the ACL policy, where the ACL traffic information includes: information about ACL traffic that flows through the multiple links from the DPE to the multiple CPEs; and sending, by the traffic analysis device, the ACL traffic information to the SDN controller by using the policy management device, where the ACL traffic information is analyzed by the SDN controller according to a preset adjustment rule to find an egress link and traffic that need to be adjusted and control the DPE to adjust egress traffic.

A fifth aspect of the present disclosure provides a policy management device, used in a software-defined networking SDN-based Internet data center IDC network, where the IDC network includes: a data center provider edge DPE, a traffic analysis device and an SDN controller that are connected to the DPE, and the policy management device; the policy management device is separately connected to the traffic analysis device and the SDN controller; and the DPE is connected to multiple core network provider edges CPEs in a public network by using multiple egress links, where the policy management device includes: a sending module, configured to send group information of at least one autonomous system AS group to the SDN controller, where the group information is used by the SDN controller to generate an AS filtering policy and deliver the AS filtering policy to the DPE, and each AS group in the at least one AS group includes one or more ASs; a receiving module, configured to obtain, by using the traffic analysis device, AS traffic information that is obtained by the DPE through statistics collection according to the AS filtering policy, where the AS traffic information includes: information about traffic of an AS group that flows through the multiple egress links from the DPE to the multiple CPEs; and a processing module, configured to generate a traffic adjustment policy according to the AS traffic information, where the traffic adjustment policy is used to instruct to adjust traffic of at least one destination AS group in the at least one AS group to at least one destination egress link in the multiple egress links, where the sending module is further configured to send the traffic adjustment policy to the SDN controller, where the traffic adjustment policy is used by the SDN controller to control the DPE to adjust egress traffic.

With reference to the fifth aspect, in a first possible implementation manner, the processing module is specifically configured to display the AS traffic information to a system user; receive, by using the receiving module, AS traffic adjustment information entered by the system user; and convert the AS traffic adjustment information into the traffic adjustment policy.

With reference to the fifth aspect, in a second possible implementation manner, the processing module is specifically configured to analyze the AS traffic information by using a preset policy rule, and generate the corresponding traffic adjustment policy.

With reference to the second possible implementation manner of the fifth aspect, in a third possible implementation manner, the processing module includes: a calculation unit, configured to calculate link bandwidth utilizations of the multiple egress links according to the AS traffic information; a search unit, configured to find an overloaded egress link whose link bandwidth utilization is greater than a first threshold that is set in the policy rule, and an underloaded egress link whose link bandwidth utilization is less than a second threshold that is set in the policy rule; a selection unit, configured to select traffic of a destination AS group from traffic of all AS groups on the overloaded egress link, and select a destination egress link from the underloaded egress link; and a generating unit, configured to generate the corresponding traffic adjustment policy, where the traffic adjustment policy is used to instruct to adjust the traffic of the destination AS group to the destination egress link.

With reference to the fifth aspect or any one of the first to third possible implementation manners of the fifth aspect, in a fourth possible implementation manner, the sending module is further configured to send VIP information to the traffic analysis device, and receive information about an elephant flow and reported by the traffic analysis device, where the elephant flow is traffic, of first N Internet protocol IP network segments with maximum traffic, obtained by the traffic analysis device by filtering out VIP traffic flowing through an IP network segment of a network egress and indicated by the VIP information from a traffic statistics packet reported by the DPE, and then converging and sequencing remaining traffic in the traffic statistics packet according to destination prefixes, where N is a positive integer; the processing module is further configured to convert the information about the elephant flow into an access control list ACL statistics rule, and send the ACL statistics rule to the SDN controller, where the ACL statistics rule is used by the SDN controller to generate an ACL policy and deliver the ACL policy to the DPE; the receiving module is further configured to obtain, by using the traffic analysis device, ACL traffic information that is obtained by the DPE through statistics collection according to the ACL policy, where the ACL traffic information includes: information about ACL traffic that flows through the multiple egress links from the DPE to the multiple CPEs; and the sending module is further configured to send the ACL traffic information to the SDN controller, where the ACL traffic information is analyzed by the SDN controller according to a preset adjustment rule to find an egress link and traffic that need to be adjusted and control the DPE to adjust egress traffic.

A sixth aspect of the present disclosure provides an SDN controller, used in a software-defined networking SDN-based Internet data center IDC network, where the IDC network includes: a data center provider edge DPE, a traffic analysis device and the SDN controller that are connected to the DPE, and a policy management device connected to the traffic analysis device and the SDN controller; and the DPE is connected to multiple core network provider edges CPEs in a public network by using multiple egress links, where the SDN controller includes: a receiving module, configured to receive group information of at least one autonomous system AS group sent by the policy management device, where each AS group in the at least one AS group includes one or more ASs; a processing module, configured to generate an AS filtering policy according to the group information; a sending module, configured to deliver the AS filtering policy to the DPE, where the AS filtering policy is used by the DPE to collect statistics to obtain AS traffic information, and the AS traffic information includes: information about traffic of an AS group that flows through the multiple egress links from the DPE to the multiple CPEs, where the receiving module is further configured to receive a traffic adjustment policy sent by the policy management device, where the traffic adjustment policy is generated by the policy management device after the policy management device obtains the AS traffic information by using the traffic analysis device, and the traffic adjustment policy is used to instruct to adjust traffic of at least one destination AS group in the at least one AS group to at least one destination egress link in the multiple egress links; and an adjustment module, configured to control, according to the traffic adjustment policy, the DPE to adjust egress traffic.

With reference to the sixth aspect, in a first possible implementation manner, the receiving module is further configured to receive an ACL statistics rule sent by the policy management device, and generate an ACL policy and deliver the ACL policy to the DPE, where the ACL policy is used by the DPE to collect statistics to obtain ACL traffic information, and the ACL traffic information includes: information about ACL traffic that flows through the multiple links from the DPE to the multiple CPEs; the receiving module is further configured to obtain, by using the traffic analysis device, ACL traffic information that is obtained by the DPE through statistics collection; and the adjustment module is further configured to analyze the ACL traffic information by using a preset adjustment rule, to find an egress link and traffic that need to be adjusted and control the DPE to adjust egress traffic.

A seventh aspect of the present disclosure provides a policy management device, used in a software-defined networking SDN-based Internet data center IDC network, where the IDC network includes: a data center provider edge DPE, a traffic analysis device and an SDN controller that are connected to the DPE, and the policy management device connected to the traffic analysis device and the SDN controller; and the DPE is connected to multiple core network provider edges CPEs in a public network by using multiple egress links, where the policy management device includes: a sending module, configured to send VIP information to the traffic analysis device; a receiving module, configured to receive information about an elephant flow and reported by the traffic analysis device, where the elephant flow is traffic, of first N Internet protocol IP network segments with maximum traffic, obtained by the traffic analysis device by filtering out VIP traffic flowing through an IP network segment of a network egress and indicated by the VIP information from a traffic statistics packet reported by the DPE, and then converging and sequencing remaining traffic in the traffic statistics packet according to destination prefixes, where N is a positive integer; and a processing module, configured to convert the information about the elephant flow into an access control list ACL statistics rule, where the processing module is further configured to send the ACL statistics rule to the SDN controller, where the ACL statistics rule is used by the SDN controller to generate an ACL policy and deliver the ACL policy to the DPE; the receiving module is further configured to obtain, by using the traffic analysis device, ACL traffic information that is obtained by the DPE through statistics collection according to the ACL policy, where the ACL traffic information includes: information about ACL traffic that flows through the multiple egress links from the DPE to the multiple CPEs; and the sending module is further configured to send the ACL traffic information to the SDN controller, where the ACL traffic information is analyzed by the SDN controller according to a preset adjustment rule to find an egress link and traffic that need to be adjusted and control the DPE to adjust egress traffic.

An eighth aspect of the present disclosure provides a traffic analysis device, used in a software-defined networking SDN-based Internet data center IDC network, where the IDC network includes: a data center provider edge DPE, the traffic analysis device and an SDN controller that are connected to the DPE, and a policy management device connected to the traffic analysis device and the SDN controller; and the DPE is connected to multiple core network provider edges CPEs in a public network by using multiple egress links, where the traffic analysis device includes: a receiving module, configured to receive a traffic statistics packet reported by the DPE, where the receiving module is further configured to receive VIP information sent by the policy management device; an analysis module, configured to filter out VIP traffic flowing through an IP network segment of a network egress and indicated by the VIP information from the traffic statistics packet reported by the DPE, and then converge and sequence on remaining traffic in the traffic statistics packet according to destination prefixes, to obtain traffic of first N Internet protocol IP network segments with maximum traffic, where N is a positive integer, and the traffic of the first N IP network segments with maximum traffic is referred to as an elephant flow; and a sending module, configured to send information about the elephant flow to the policy management device, where the information about the elephant flow is converted by the policy management device into an access control list ACL statistics rule to be sent to the SDN controller, and the ACL statistics rule is used by the SDN controller to generate an ACL policy and deliver the ACL policy to the DPE, where the receiving module is further configured to obtain ACL traffic information that is obtained by the DPE through statistics collection according to the ACL policy, where the ACL traffic information includes: information about ACL traffic that flows through the multiple links from the DPE to the multiple CPEs; and the sending module is further configured to send the ACL traffic information to the SDN controller by using the policy management device, where the ACL traffic information is analyzed by the SDN controller according to a preset adjustment rule to find an egress link and traffic that need to be adjusted and control the DPE to adjust egress traffic.

A ninth aspect of the present disclosure provides a system for performing balance adjustment on egress traffic of a software-defined networking SDN-based Internet data center IDC network, where the system includes a data center provider edge DPE, a traffic analysis device and an SDN controller that are connected to the DPE, and a policy management device connected to the traffic analysis device and the SDN controller; and the DPE is connected to multiple core network provider edges CPEs in a public network by using multiple egress links, where the policy management device is configured to send group information of preset at least one autonomous system AS group to the SDN controller, where the group information is used by the SDN controller to generate an AS filtering policy and deliver the AS filtering policy to the DPE, and each AS group in the at least one AS group includes one or more egress destination ASs; obtain, by using the traffic analysis device, AS traffic information that is obtained by the DPE through statistics collection according to the AS filtering policy, where the AS traffic information includes: information about traffic of an AS group that flows through the multiple egress links from the DPE to the multiple CPEs; generate a traffic adjustment policy according to the AS traffic information, where the traffic adjustment policy is used to instruct to adjust traffic of at least one destination AS group in the at least one AS group to at least one destination egress link in the multiple egress links; and send the traffic adjustment policy to the SDN controller; the SDN controller is configured to receive the group information of the at least one autonomous system AS group sent by the policy management device, and generate the AS filtering policy according to the group information and deliver the AS filtering policy to the DPE, where the AS filtering policy is used by the DPE to collect statistics to obtain the AS traffic information; receive the traffic adjustment policy sent by the policy management device; and control, according to the traffic adjustment policy, the DPE to adjust egress traffic; and the traffic analysis device is configured to obtain the AS traffic information that is obtained by the DPE through statistics collection according to the AS filtering policy, where the AS traffic information includes: the information about traffic of the AS group that flows through the multiple egress links from the DPE to the multiple CPEs; and report the AS traffic information to the policy management device.

It can be seen from above that, in some feasible implementation manners of the present disclosure, technical solutions in which a policy management device delivers group information of at least one AS group, to obtain AS traffic information that is obtained by a DPE through statistics collection, where the AS traffic information includes information about traffic of an AS group that flows through multiple egress links from the DPE to multiple CPEs; generates a traffic adjustment policy according to the information, where the traffic adjustment policy is used by an SDN controller to control the DPE to adjust traffic; and adjusts traffic of at least one destination AS group in the at least one AS group to at least one destination egress link in the multiple egress links are used, which achieves the following technical effects:

By performing traffic statistics collection and traffic adjustment according to an AS group, for egress traffic of an IDC network, real-time performance and precision of adjustment can be improved, so that blind adjustment without a basis can be avoided, and arbitrary adjustment according to false experience can be avoided.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill may still derive other drawings from these accompanying drawings without creative efforts.

DESCRIPTION OF EMBODIMENTS

Embodiments of the present disclosure provide a method, a device, and a system for performing balance adjustment on egress traffic of an SDN-based IDC network, to resolve a technical problem in the prior art that balance adjustment cannot be precisely performed on egress traffic of an IDC network.

To make a person skilled in the art understand the technical solutions in the present disclosure better, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Detailed descriptions are separately provided below by using specific embodiments.

Figure 1:
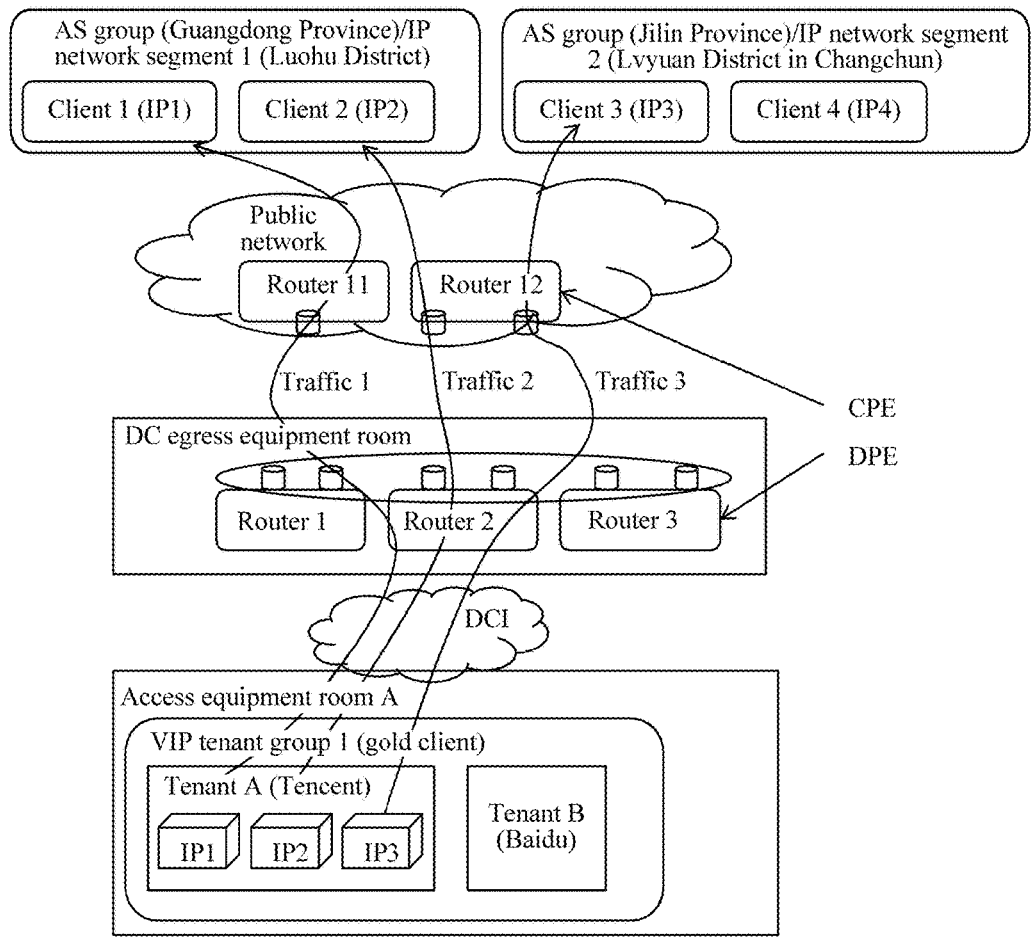
FIG. 1 is a schematic diagram of networking according to an embodiment of the present disclosure.

FIG. 1 is a schematic diagram of networking according to an embodiment of the present disclosure.

As shown in FIG. 1, a tenant device in a DC network accesses a public network by using a DPE (data center provider edge) in the DC network. Specifically, the DPE is connected to a CPE (core network provider edge) in the public network. One DPE may be connected to multiple CPEs. The DC network may be specifically an IDC network. The public network may be a backbone network, a 163 network, or the like. The DPE is an egress device of the DC network, generally may be a router, and may be disposed in a DC egress equipment room. The CPE is an ingress device of the public network, and generally may be a router. A link between the DPE and the CPE may be referred to as an egress link of the IDC network.

A tenant is a merchant who rents a cloud service of an operator in the DC, such as Facebook or Amazon. A tenant device is a server device or the like rented by the tenant in the DC. The tenant device accesses the public network by using a DPE and a CPE. The tenant may include a VIP (very important person) tenant. A VIP tenant group includes multiple VIP tenants, and is a group of high-value tenants, and a high-quality bandwidth service needs to be provided for a tenant of such a type. For example, user traffic reorganization needs to be performed in a link whose bandwidth utilization does not exceed 80%, and if the bandwidth utilization may exceed 80%, a non-VIP tenant needs to be transferred, to ensure high quality of a VIP.

In the public network, an AS (autonomous system), an IP (Internet protocol) network segment, or the like may be used to indicate different network ranges or granularities. A granularity of an IP network segment is less than that of an AS. For example, an AS may represent a provincial network, for example, a network of Guangdong province or Jilin province, and each AS accounts for about 5% of egress traffic; an IP network segment is a regional division smaller than a province, and may represent a network of a district or a county, for example, a network of Luohu District in Shenzhen or a network of Lvyuan District in Changchun, and each IP network segment accounts for 1% of egress traffic.

Figure 2:
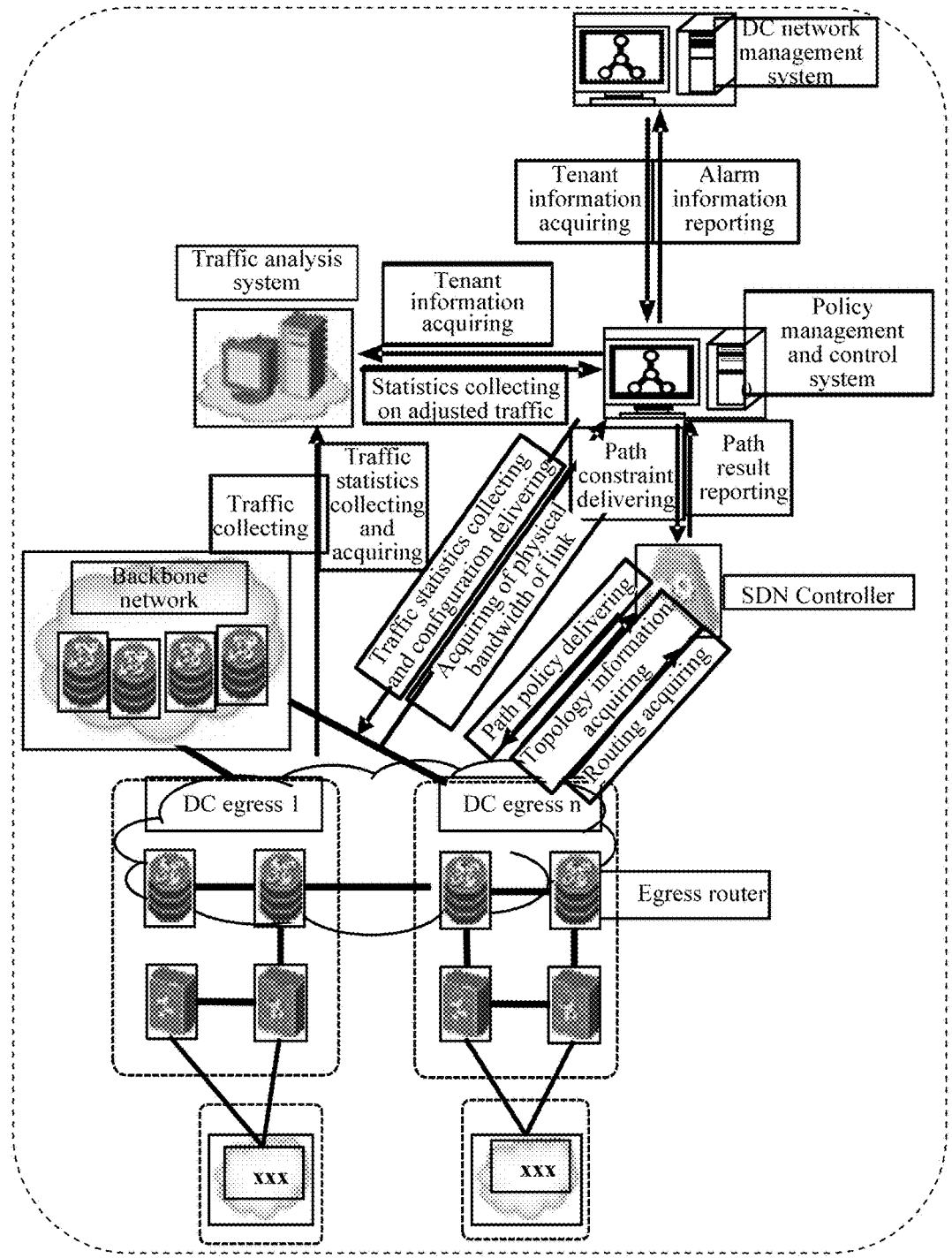
FIG. 2 is a schematic diagram of an SDN-based IDC network according to an embodiment of the present disclosure.

FIG. 2 is a schematic diagram of an SDN-based IDC network according to an embodiment of the present disclosure.

As shown in FIG. 2, an SDN-based IDC network (SDN IDC network) includes: a DPE, a traffic analysis device and an SDN controller that are separately connected to the DPE, and a policy management device separately connected to the traffic analysis device and the SDN controller; and optionally, may further include a DC network management system connected to the policy management device. The DPE generally may be a router that functions as a DC egress, that is, an egress router. The DPE accesses a public network (for example, a backbone network) by connecting to multiple CPEs in the public network.

The policy management device is responsible for functions such as delivering traffic adjustment policy, previewing and confirming an adjustment result, and displaying a network topology in real time.

The traffic analysis device provides functions such as elephant flow mining and statistics collection on link traffic, tenant traffic, and an elephant flow. The elephant flow refers to traffic, of first N IP network segments with maximum traffic, obtained by filtering out VIP traffic from a NetStream packet reported by a DPE, and then converging and sequencing remaining traffic in the NetStream packet according to destination prefixes, where N is a positive integer, that is, the TOP (maximum) N traffic.

The SDN Controller may perform centralized path calculation based on traffic statistics, routability, and a traffic adjustment policy, to implement automatic optimization of link traffic. The SDN Controller supports multiple manners of intelligent traffic adjustment and control, such as based on a source IP, a source IP plus a destination IP prefix, a source IP plus a destination AS, a destination IP prefix, and a destination AS. The SDN Controller may provide a specified path or a low-load bearer for a VIP tenant.

When accessing traffic of a destination AS or a destination IP network segment, the tenant device may use one or more DPEs, and one DPE may access the public network by using one or more CPEs. A link between a DPE and a CPE is referred to as an egress link, and when accessing the traffic of the destination AS or the destination IP network segment, the tenant device may pass through multiple egress links. On the other hand, one egress link may carry traffic of multiple ASs or multiple IP network segments that is accessed by the tenant device. In actual application, traffic on different egress links may be different, some egress links may be overloaded, and some egress links may be underloaded, that is, egress traffic of the SDN IDC network may be imbalanced. However, in the prior art, balance adjustment cannot be implemented on egress traffic of an IDC network. Therefore, the embodiments of the present disclosure provide a method for adjusting egress traffic of an SDN-based IDC network. The following provides detailed descriptions with reference to the accompanying drawings. It should be understood that, for some producers, a control layer in an SDN network and corresponding to an SDN controller is implemented by only software, and in some specific SDN IDC networking, an SDN controller, a policy management device, and a traffic analysis device may be all implemented by means of software or an operating system, that is, they have no corresponding physical device entity, or are integrated with another function on one or more network devices, for example, the policy management device is integrated on the traffic analysis device in a software form, or the SDN controller is integrated on the policy management device in a software form, or one or more of the three are integrated on another network device (such as a DPE) of the SDN IDC network, or even the three are integrated in an operating system. The embodiments of the present disclosure do not limit the implementation manners of the SDN controller, the policy management device (or operating system), and the traffic analysis device (or operating system).

Embodiment 1

Figure 3:
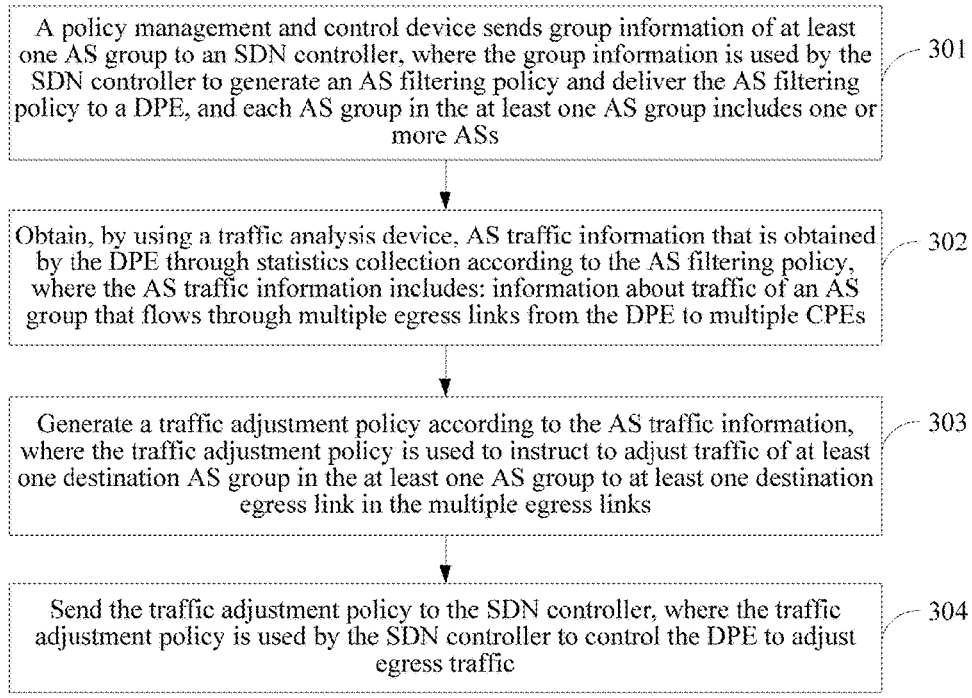
FIG. 3 is a flowchart of a method for performing balance adjustment on egress traffic of an SDN-based IDC network according to Embodiment 1 of the present disclosure.

Referring to FIG. 3, this embodiment of the present disclosure provides a method for performing balance adjustment on egress traffic of an SDN-based IDC network. The method is used to adjust egress traffic from an IDC network to a public network, and the IDC network is shown in FIG. 2, and includes: a data center provider edge DPE, a traffic analysis device and an SDN controller that are connected to the DPE, and a policy management device connected to the traffic analysis device and the SDN controller; and the DPE is connected to multiple core network provider edges CPEs in a public network by using multiple egress links. This embodiment of the present disclosure may be used to perform balance adjustment on egress traffic of an IDC network according to a granularity of an AS. The method may include:

301: The policy management device sends group information of preset multiple AS (autonomous system) groups to the SDN controller, where the group information is used by the SDN controller to generate an AS filtering policy and deliver the AS filtering policy to the DPE, and each AS group in the at least one AS group includes one or more ASs.

In this embodiment of the present disclosure, group information of at least one autonomous system AS group preset by the policy management device may be from the following manners: The policy management device may receive an AS grouping policy entered by a system user, group a manageable AS according to the AS grouping policy, and set at least one AS group; or the policy management device may automatically group a manageable AS according to a preset policy, and set at least one AS group. In the set at least one set AS group, each AS group may include one or more egress destination ASs of the SDN IDC network. Optionally, two or more ASs that are close in region may be grouped into an AS group.

In this step, the policy management device sends the group information of the preset at least one AS group to the SDN controller, and the SDN controller may generate an AS filtering policy according to the group information, where the AS filtering policy is used to instruct to perform traffic statistics collection according to the set AS group, collect statistics to obtain all traffic whose traffic destination is a same AS, and calculate a traffic volume. The SDN controller delivers the AS filtering policy to the DPE, and the DPE performs traffic statistics collection according to the instruction of the AS filtering policy, to obtain AS traffic information.

302: Obtain, by using the traffic analysis device, AS traffic information that is obtained by the DPE through statistics collection according to the AS filtering policy, where the AS traffic information includes: information about traffic of an AS group that flows through the multiple egress links from the DPE to the multiple CPEs.

The traffic information that is obtained by the DPE through statistics collection may include: information about traffic of an AS group that flows through each egress link in the multiple egress links from the DPE to the multiple CPEs connected to the DPE; and specifically, may include information about all or some of the traffic of the AS group on each egress link. The AS traffic information that is obtained by the DPE through statistics collection may be actively reported to the traffic analysis device periodically or regularly, or may be reported to the traffic analysis device after a periodical or regular query of the traffic analysis device is received.

The traffic analysis device may actively collect the AS traffic information from the DPE, or may start to collect the AS traffic information from the DPE after receiving a collection notification sent by the policy management device. Likewise, the traffic analysis device may actively report the collected AS traffic information (the AS traffic information may be actively reported by the DPE or may be actively collected by the traffic analysis device) to the policy management device, or may be actively acquired by the policy management device by using the traffic analysis device, which is not limited in the present disclosure. Optionally, the traffic analysis device may perform some processing such as analysis and integration on the collected AS traffic information, for example, calculate a link bandwidth utilization of each egress link, and when necessary, may also perform some filtering processing, to filter out some particular traffic information. The traffic analysis device returns the collected AS traffic information to the policy management device, for use by the policy management device when the policy management device formulates a traffic adjustment policy.

It should be noted that, the information about the traffic of the AS group that flows through the multiple egress links from the DPE to the multiple CPEs connected to the DPE may be understood as: information about traffic that flows through each egress link of each AS included in each AS group in the at least one AS group indicated by the group information. During traffic statistics collection, statistics collection is performed, according to an AS, on traffic that flows through each egress link, to collect statistics on traffic of each AS in the at least one AS group. For example, there are two AS groups, where a first AS group includes AS1 to AS5, a second AS group includes AS6 to AS8, and the AS traffic information that is obtained by the DPE through statistics collection may include: information about traffic, on each egress link, of each AS in AS1 to AS8.

303: Generate a traffic adjustment policy according to the AS traffic information, where the traffic adjustment policy is used to instruct to adjust traffic of at least one destination AS group in the at least one AS group to at least one destination egress link in the multiple egress links.

In this embodiment of the present disclosure, a traffic adjustment policy used to perform traffic balance adjustment for an egress of the IDC network is generated in the policy management device, where the traffic adjustment policy is used to instruct to adjust traffic of a destination AS group to a destination egress link. Generally, an overloaded egress link (that is, an egress link with excessively heavy load) and an underloaded egress link (that is, an egress link with relatively light load) in all egress links may be found according to the AS traffic information, traffic of one or more AS groups is selected from the overloaded egress link as the traffic of the destination AS group, and an egress link is selected from the underloaded link as the destination egress link. When the destination AS group is selected, the destination AS group may be selected arbitrarily, or one or more AS groups with maximum traffic may be selected, or the destination AS group may be selected in other manners. When the destination egress link is selected, an egress link with lightest load may be selected, or the destination egress link may be selected in other manners. An egress link whose link bandwidth utilization is greater than a first threshold may be defined as an overloaded egress link, and an egress link whose link bandwidth utilization is less than a second threshold may be defined as an underloaded egress link, where the first threshold is greater than the second threshold. The link bandwidth utilization may be calculated according to the AS traffic information according to a common calculation method in the communications field.

In some implementation manners of the present disclosure, the policy management device has a display apparatus, and may display the acquired AS traffic information by using the display apparatus for viewing by the system user; the system user may find an overloaded egress link and an underloaded egress link by observing the AS traffic information (including a link bandwidth utilization of each egress link), select traffic of a destination AS group from the overloaded egress link and select a destination egress link from the underloaded egress link, and enter traffic adjustment information; and the policy management device may receive the traffic adjustment information entered by the system user, and convert the traffic adjustment information into a traffic adjustment policy.

In some other implementation manners of the present disclosure, some policy rules may be preset in the policy management device, so that the policy management device may analyze the AS traffic information by using a preset policy rule, and automatically generate the corresponding traffic adjustment policy without manual participation. Specifically, the policy rule may include a set first threshold and second threshold, and the policy management device may calculate link bandwidth utilizations of the multiple egress links according to the AS traffic information; find an overloaded egress link whose link bandwidth utilization is greater than the first threshold that is set in the policy rule, and an underloaded egress link whose link bandwidth utilization is less than the second threshold that is set in the policy rule; select traffic of a destination AS group from traffic of all AS groups on the overloaded egress link, and select a destination egress link from the underloaded egress link; and accordingly generate the corresponding traffic adjustment policy, where the traffic adjustment policy is used to instruct to adjust the traffic of the destination AS group to the destination egress link.

304: Send the traffic adjustment policy to the SDN controller, where the traffic adjustment policy is used by the SDN controller to control the DPE to adjust egress traffic.

In this step, the policy management device sends the generated traffic adjustment policy to the SDN controller, and the SDN controller may perform centralized path calculation according to the traffic adjustment policy or in combination with other information such as routability information, to generate a specific link adjustment instruction and deliver the link adjustment instruction to the DPE to adjust traffic. Specifically, the SDN controller may control the DPE by delivering the link adjustment instruction, to adjust egress traffic; or the SDN controller may deliver the link adjustment instruction to the DPE, and the DPE adjusts egress traffic according to content of the link adjustment instruction. This embodiment of the present disclosure does not limit a specific implementation manner of this step. For example, traffic of an AS group on an egress link between DPE1 and CPE1 is adjusted to an egress link between DPE1 and CPE2, or adjusted to an egress link between DPE2 and CPE2. The foregoing controlling the DPE to perform specific traffic adjustment according to the traffic adjustment policy may be operated according to a conventional SDN technology, which is not described in detail in this specification.

For ease of better understanding of the technical solutions provided in this embodiment of the present disclosure, a description is provided below by using an implementation manner in a specific scenario as an example.

Figure 4:
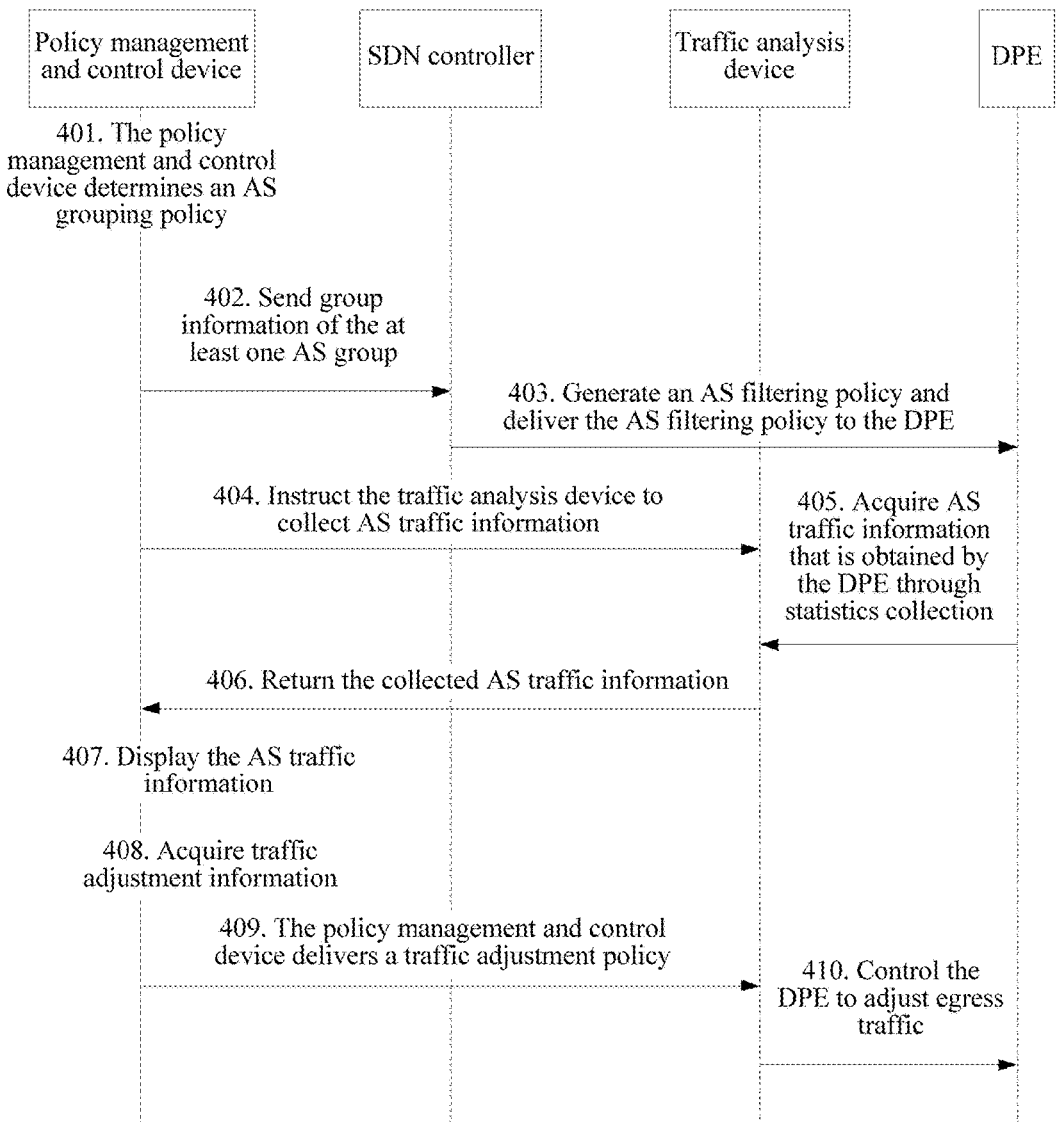
FIG. 4 is a flowchart of a method for performing balance adjustment on egress traffic of an SDN-based IDC network in a specific scenario according to an embodiment of the present disclosure.

Referring to FIG. 4, another method for performing balance adjustment on egress traffic of an SDN-based IDC network in this embodiment of the present disclosure may include:

401: A policy management device determines an AS grouping policy.

Specifically, the AS grouping policy may be entered by a system user, for example, the system user groups a manageable AS, and enters the AS grouping policy to the policy management device, where an AS group may include one AS or multiple ASs; or may be managed (for example, pre-stored) in the policy management device.

402: The policy management device sets at least one AS group according to the AS grouping policy, and sends group information of the at least one AS group to an SDN controller.

403: The SDN controller generates an AS filtering policy according to the group information and delivers the AS filtering policy to a DPE.

404: The policy management device instructs a traffic analysis device to collect AS traffic information.

405: The traffic analysis device acquires AS traffic information that is obtained by the DPE through statistics collection according to the AS filtering policy.

406: The traffic analysis device returns the collected AS traffic information to the policy management device, where the AS traffic information includes: information about traffic of an AS group that flows through multiple egress links from the DPE to CPEs.

Optionally, the policy management device may also acquire the AS traffic information from the traffic analysis device. Optionally, the AS traffic information may further include: a link bandwidth utilization of each egress link, and whether the egress link is an overloaded egress link or an underloaded egress link.

407: The policy management device displays the AS traffic information for viewing by a system user.

408: The policy management device acquires traffic adjustment information.

The system user finds an overloaded egress link and an underloaded egress link by observing the AS traffic information, selects traffic of a destination AS group from the overloaded egress link and selects a destination link from the underloaded egress link, and enters the traffic adjustment information.

409: The policy management device converts the traffic adjustment information into a traffic adjustment policy, and delivers the traffic adjustment policy to the SDN controller, where the traffic adjustment policy is used to instruct to adjust traffic of a destination AS group to a destination egress link.

410: The SDN controller controls, according to the traffic adjustment policy, the DPE to adjust egress traffic.

Specifically, the SDN controller may control the DPE by delivering a link adjustment instruction, to adjust egress traffic; or the SDN controller may deliver a link adjustment instruction to the DPE, and the DPE adjusts egress traffic according to content of the link adjustment instruction. This embodiment of the present disclosure does not limit a specific implementation manner of this step.

In the method of this embodiment of the present disclosure, delivering the AS filtering policy generated based on the group information of the at least one AS group to the DPE to instruct the DPE to perform traffic statistics collection is actually monitoring and adjusting egress traffic of an IDC network by using a QPPB (QOS Policy Propagation Through the Border Gateway Protocol) technology. The QPPB technology is a technology of deploying QOS (quality of service) by using a BGP (border gateway protocol) routing policy.

It can be seen from above that, in some feasible implementation manners of the present disclosure, a method for performing balance adjustment on egress traffic of an SDN-based IDC network is provided, and in the method, technical solutions in which a policy management device delivers group information of at least one AS group, to obtain AS traffic information that is obtained by a DPE through statistics collection, where the AS traffic information includes information about traffic of an AS group that flows through multiple egress links from the DPE to multiple CPEs; generates a traffic adjustment policy according to the AS traffic information, where the traffic adjustment policy is used by an SDN controller to control the DPE to adjust traffic; and adjusts traffic of at least one destination AS group in the at least one AS group to at least one destination egress link in the multiple egress links are used, which achieves the following technical effects:

By performing traffic statistics collection and traffic adjustment according to an AS, for egress traffic of an SDN-based IDC network, real-time performance and precision of adjustment can be improved, so that blind adjustment without a basis can be avoided, and arbitrary adjustment according to false experience can be avoided.

Traffic of each AS accounts for about 5% of total egress traffic, and by using the method of this embodiment of the present disclosure, a monitoring precision of 100% and an adjustment precision of about 5% can be implemented.

Embodiment 2

Figure 5:
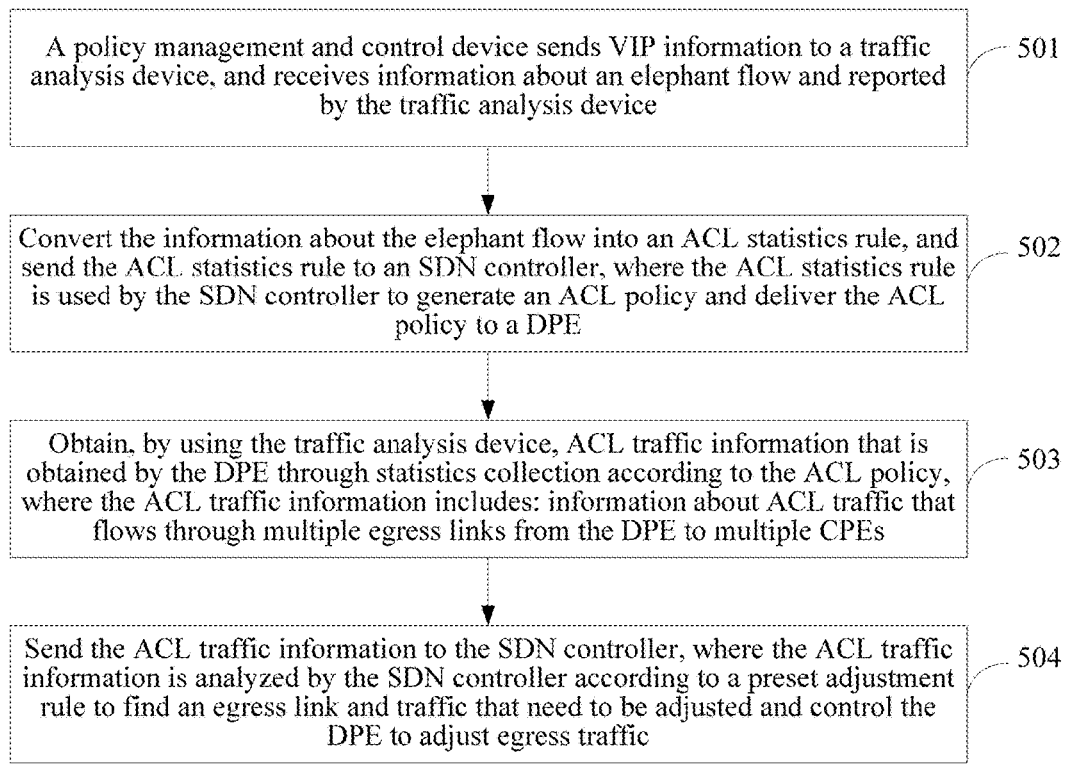
FIG. 5 is a flowchart of a method for performing balance adjustment on egress traffic of an SDN-based IDC network according to Embodiment 2 of the present disclosure.

Referring to FIG. 5, this embodiment of the present disclosure further provides another method for performing balance adjustment on egress traffic of an SDN-based IDC network. The method is used to adjust egress traffic from an IDC network to a public network, and the IDC network is shown in FIG. 2, and includes: a DPE, a traffic analysis device and an SDN controller that are connected to the DPE, and a policy management device connected to the traffic analysis device and the SDN controller; and the DPE is connected to multiple CPEs in a public network by using multiple egress links. This embodiment of the present disclosure may be used to adjust traffic for egress bandwidth of the SDN-based IDC network according to a granularity smaller than an AS, that is, according to a granularity of an IP (Internet protocol) network segment. The method may include:

501: The policy management device sends VIP information to the traffic analysis device, and receives information about an elephant flow and reported by the traffic analysis device.

The elephant flow is traffic, of first N IP network segments with maximum traffic, obtained by the traffic analysis device by filtering out VIP traffic flowing through an IP network segment of a network egress and indicated by the VIP information from a traffic statistics packet reported by the DPE, and then converging and sequencing remaining traffic in the traffic statistics packet according to destination prefixes, where N is a positive integer. The traffic statistics packet, for example, may be specifically a NetStream packet or a Netflow packet. It should be understood that, the present disclosure does not limit a specific type of the traffic statistics packet (the NetStream packet, or the Netflow packet, or the like is merely described for example). In addition, the present disclosure also does not limit a specific form of the traffic statistics packet and a protocol followed by the traffic statistics packet.

In this embodiment of the present disclosure, a system user may configure VIP information on the policy management device, where the VIP information includes identification information of one or more particular IP network segments, and may be configured according to a destination IP, or may be configured according to a source IP. For example, all IP addresses whose destination IPs are server devices rented by a tenant Taobao may be configured to VIPs.

The policy management device sends the configured VIP information to the traffic analysis device. The traffic analysis device may acquire the traffic statistics packet, for example, a NetStream packet, reported by the DPE. The traffic analysis device provides a packet statistics collection function, and may distinguish traffic information according to a destination IP address, a destination port number, a source IP address, a source port number, a protocol number, and tos of the packet, and perform independent data statistics collection for different traffic information.

The traffic analysis device may perform filtering and sequencing processing on the traffic statistics packet, to obtain an elephant flow, and report information about the elephant flow to the policy management device. The elephant flow refers to traffic, of first N IP network segments with maximum traffic, obtained by filtering out VIP traffic indicated by the VIP information from the traffic statistics packet reported by the DPE, and then converging and sequencing remaining traffic in the traffic statistics packet according to destination prefixes, where N is a positive integer, that is, the TOP (maximum) N traffic.

502: Convert the information about the elephant flow into an ACL statistics rule, and send the ACL statistics rule to the SDN controller, where the ACL statistics rule is used by the SDN controller to generate an ACL policy and deliver the ACL policy to the DPE.

The policy management device may convert the information about the elephant flow into an ACL (access control list) statistics rule. An access control list (ACL) is an instruction list of a router and a switch interface, and is used to control data packets getting in and out of a port. The ACL may be used to filter traffic in a network, and is a technical means for controlling network access. After the ACL is configured, network traffic may be limited, where a particular device may be allowed to perform access, and a data packet of a particular port may be specified to be forwarded.

The policy management device sends the ACL statistics rule obtained through conversion to the SDN controller, and the SDN controller may generate a corresponding ACL policy and deliver the ACL policy to the DPE, to instruct the DPE to perform corresponding traffic statistics collection according to the ACL policy, and acquire ACL traffic information. The ACL traffic information includes: information about ACL traffic on each link in multiple links (that is, the multiple egress links) from the DPE to the multiple CPEs.

503: Obtain, by using the traffic analysis device, ACL traffic information that is obtained by the DPE through statistics collection according to the ACL policy, where the ACL traffic information includes: information about ACL traffic that flows through the multiple egress links from the DPE to the multiple CPEs.

The policy management device may regularly or periodically acquire, by using the traffic analysis device, ACL traffic information that is obtained by the DPE through statistics collection.

It should be understood that, for a further description of this step, reference may be made to step 302 of Embodiment 1, where a further description related to the ACL traffic information in this step may be similar to description content related to the AS traffic information in step 302, which is not described herein for brevity.

504: Send the ACL traffic information to the SDN controller, where the ACL traffic information is analyzed by the SDN controller according to a preset adjustment rule to find an egress link and traffic that need to be adjusted and control the DPE to adjust egress traffic.

The policy management device may regularly or periodically send the acquired ACL traffic information to the SDN controller. The SDN controller may analyze the ACL traffic information by using a preset adjustment rule, to find a link and traffic that need to be adjusted and control the DPE to adjust traffic. For example, some traffic is adjusted from an overloaded link to an underloaded link. In this way, automatic balance of network traffic is implemented.

For ease of better understanding of the technical solutions provided in this embodiment of the present disclosure, a description is provided below by using an implementation manner in a specific scenario as an example.

Figure 6:
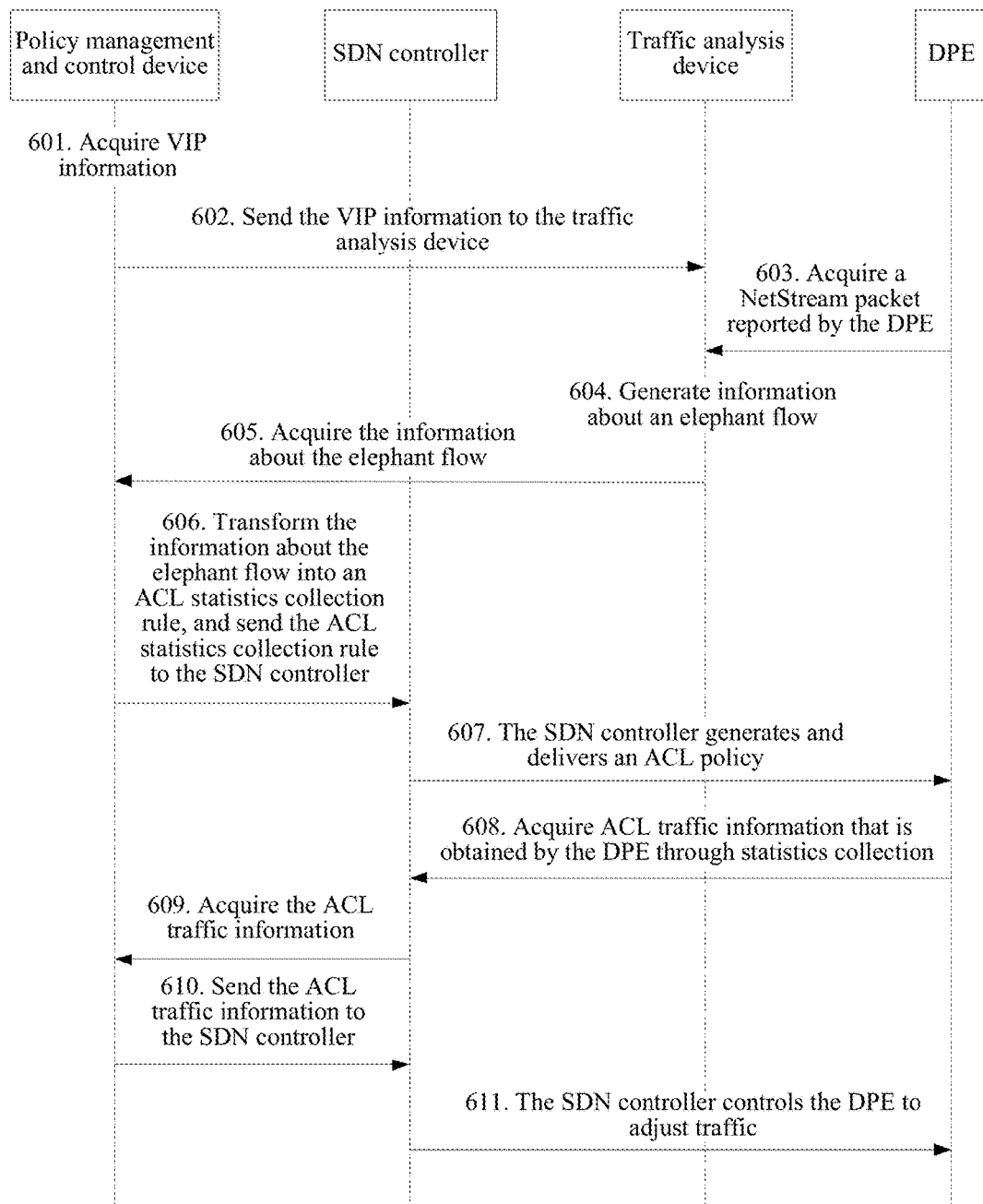
FIG. 6 is a flowchart of a method for performing balance adjustment on egress traffic of an SDN-based IDC network in a specific scenario according to an embodiment of the present disclosure.

Referring to FIG. 6, another method for performing balance adjustment on egress traffic of an SDN-based IDC network in this embodiment of the present disclosure may include:

601: A policy management device acquires VIP information configured by a system user.

602: The policy management device sends the VIP information to a traffic analysis device.

603: The traffic analysis device acquires a NetStream packet reported by a DPE.

604: The traffic analysis device filters out VIP traffic indicated by the VIP information from the NetStream packet, and then converges and sequences remaining traffic in the NetStream packet according to destination prefixes, to generate information about an elephant flow, where the elephant flow refers to traffic, of first N IP network segments with maximum traffic, obtained after sequencing, where N is a positive integer.

605: The policy management device regularly acquires the information about the elephant flow from the traffic analysis device.

Specifically, the information about the elephant flow may be obtained by the policy management device by regularly requesting the information about the elephant flow from the traffic analysis device actively or by commanding the traffic analysis device to report the information about the elephant flow, or may be regularly reported by the traffic analysis device actively.

606: The policy management device converts the information about the elephant flow into an ACL statistics rule, and sends the ACL statistics rule to an SDN controller.

607: The SDN controller generates an ACL policy and delivers the ACL policy to the DPE.

608: The traffic analysis device regularly acquires ACL traffic information that is obtained by the DPE through statistics collection according to the ACL policy.

609: The policy management device regularly acquires the ACL traffic information from the traffic analysis device.

610: The policy management device sends the ACL traffic information to the SDN controller.

611: The SDN controller analyzes the ACL traffic information by using a preset adjustment rule, to find a link and traffic that need to be adjusted and control the DPE to adjust traffic.

In the foregoing embodiment, an elephant flow of an IP network segment of a network egress is identified, and precise traffic monitoring may be performed on the identified elephant flow (the IP network segment or a marked tenant) of the network egress by using an ACL. In some feasible implementation manners of the present disclosure, the following technical effects are achieved:

By performing traffic statistics collection and traffic adjustment according to an IP network segment, for egress traffic of an IDC network, real-time performance and precision of adjustment can be improved, so that blind adjustment without a basis can be avoided, and arbitrary adjustment according to false experience can be avoided.

Moreover, VIP traffic is filtered out, so that VIP clients are not affected when traffic adjustment is performed.

In addition, traffic of each IP network segment accounts for about 1% of total egress traffic, and by using the method of this embodiment of the present disclosure, a monitoring precision of 100% and an adjustment precision of about 1% can be implemented.

Embodiment 3

In some embodiments of the present disclosure, a method for performing balance adjustment on egress traffic of an SDN-based IDC network is further provided. The method is used to adjust egress traffic from an IDC network to a public network, and the IDC network is the IDC network shown in FIG. 2.

The method may include: steps 301 to 305 in Embodiment 1; and steps 501 to 504 in Embodiment 2. Steps 301 to 305 may be performed first, and then steps 501 to 504 are performed; or steps 501 to 504 may be performed first, and then steps 301 to 305 are performed; or the steps may be performed in another sequence.

For more detailed content, refer to the content recorded in Embodiment 1 and Embodiment 2.

In this embodiment of the present disclosure, first, coarse adjustment is performed on network traffic, that is, adjustment is performed according to a granularity of an AS, where an adjustment precision reaches about 5%; and then, precise fine adjustment is performed on the network traffic, that is, adjustment is performed according to a granularity of an IP network segment, where an adjustment precision reaches about 1%, so that rapid and precise traffic adjustment can be implemented with a step length from 1% to 5%.

Embodiment 4

Figure 7A:
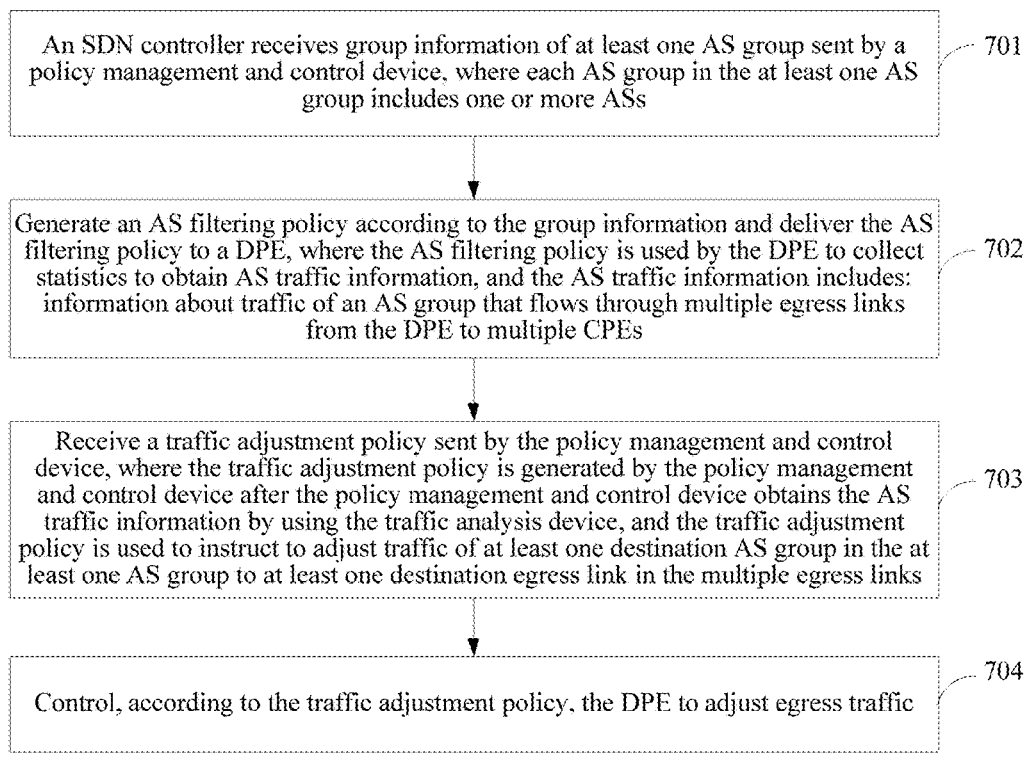
FIG. 7a is a flowchart of a method for performing balance adjustment on egress traffic of an SDN-based IDC network according to Embodiment 4 of the present disclosure.

Referring to FIG. 7a, this embodiment of the present disclosure further provides a method for performing balance adjustment on egress traffic of an SDN-based IDC network, used to adjust egress traffic from an IDC network to a public network, where the IDC network includes: a data center provider edge DPE, a traffic analysis device and an SDN controller that are connected to the DPE, and a policy management device connected to the traffic analysis device and the SDN controller; and the DPE is connected to multiple core network provider edges CPEs in a public network by using multiple egress links.

The method of this embodiment of the present disclosure is executed by the SDN controller, and the method may include:

701: The SDN controller receives group information of at least one AS group sent by the policy management device, where each AS group in the at least one AS group includes one or more ASs.

702: Generate an AS filtering policy according to the group information and deliver the AS filtering policy to the DPE, where the AS filtering policy is used by the DPE to collect statistics to obtain AS traffic information, and the AS traffic information includes: information about traffic of an AS group that flows through the multiple egress links from the DPE to the multiple CPEs.

703: Receive a traffic adjustment policy sent by the policy management device, where the traffic adjustment policy is generated by the policy management device after the policy management device obtains the AS traffic information by using the traffic analysis device, and the traffic adjustment policy is used to instruct to adjust traffic of at least one destination AS group in the at least one AS group to at least one destination egress link in the multiple egress links.

704: Control, according to the traffic adjustment policy, the DPE to adjust egress traffic.

Figure 7B:
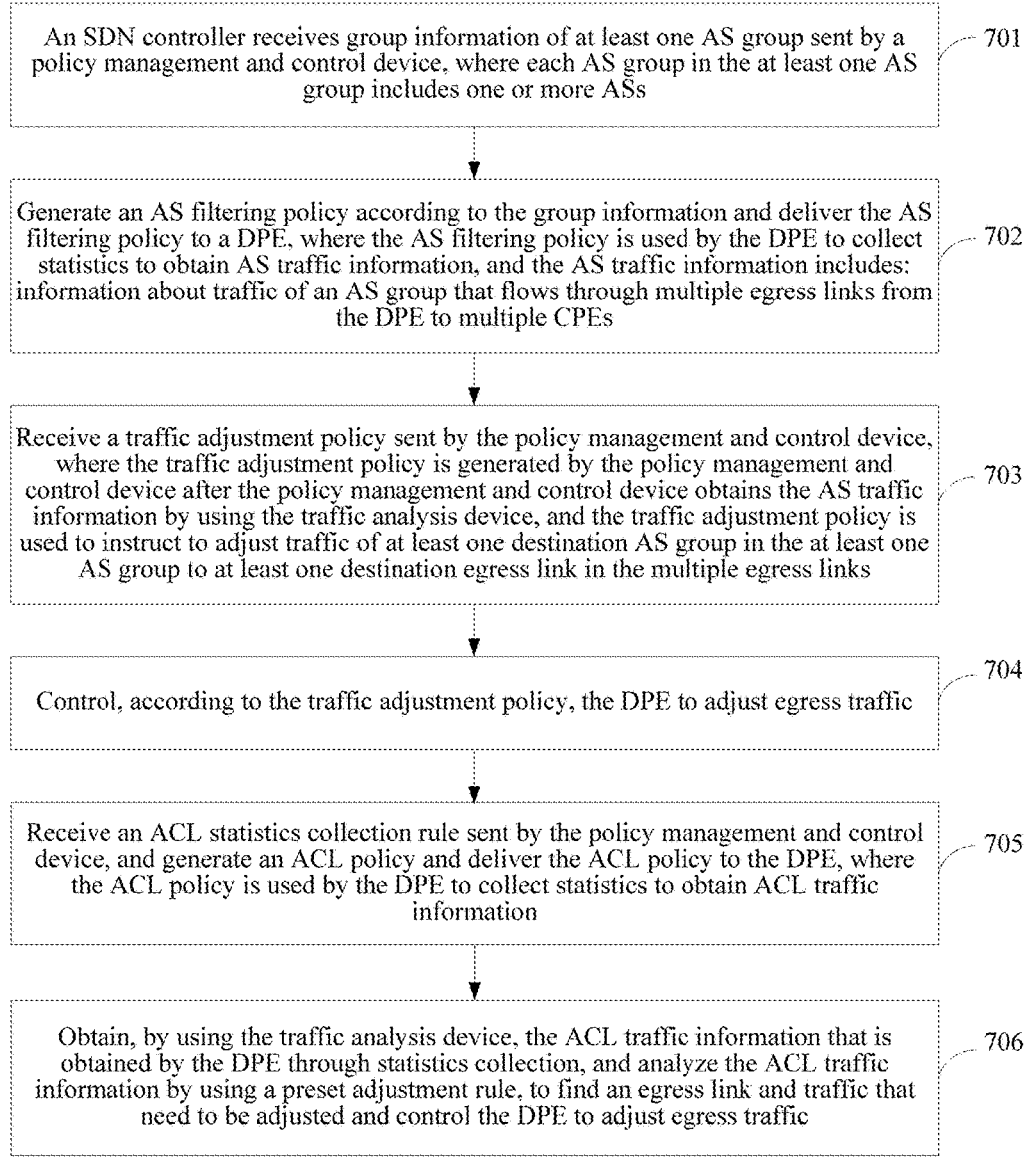
FIG. 7b is a flowchart of another method for performing balance adjustment on egress traffic of an SDN-based IDC network according to Embodiment 4 of the present disclosure.

Referring to FIG. 7b, in some embodiments, after the controlling, according to the traffic adjustment policy, the DPE to adjust egress traffic, the method further includes:

705: Receive an ACL statistics rule sent by the policy management device, and generate an ACL policy and deliver the ACL policy to the DPE, where the ACL policy is used by the DPE to collect statistics to obtain ACL traffic information.

The ACL traffic information includes: information about ACL traffic that flows through the multiple links from the DPE to the multiple CPEs.

706: Obtain, by using the traffic analysis device, the ACL traffic information that is obtained by the DPE through statistics collection, and analyze the ACL traffic information by using a preset adjustment rule, to find an egress link and traffic that need to be adjusted and control the DPE to adjust egress traffic.

The method of this embodiment of the present disclosure is executed by the SDN controller. For a more detailed description of this embodiment of the present disclosure, refer to the content recorded in Embodiments 1 to 3. This embodiment achieves the following technical effects:

By performing traffic statistics collection and traffic adjustment according to an AS group, for egress traffic of an IDC network, real-time performance and precision of adjustment can be improved, so that blind adjustment without a basis can be avoided, and arbitrary adjustment according to false experience can be avoided.

Traffic of each AS group accounts for about 5% of total egress traffic, and by using the method of this embodiment of the present disclosure, a monitoring precision of 100% and an adjustment precision of about 5% can be implemented.

In an exemplary embodiment, traffic statistics collection and traffic adjustment may be further performed according to an IP network segment, to implement real-time and precise balance adjustment on the egress traffic of the IDC network. Moreover, VIP traffic may be filtered out, so that VIP clients are not affected when traffic adjustment is performed. Traffic of each IP network segment accounts for about 1% of the total egress traffic, and a monitoring precision of 100% and an adjustment precision of about 1% can be implemented.

Embodiment 5

Figure 8:
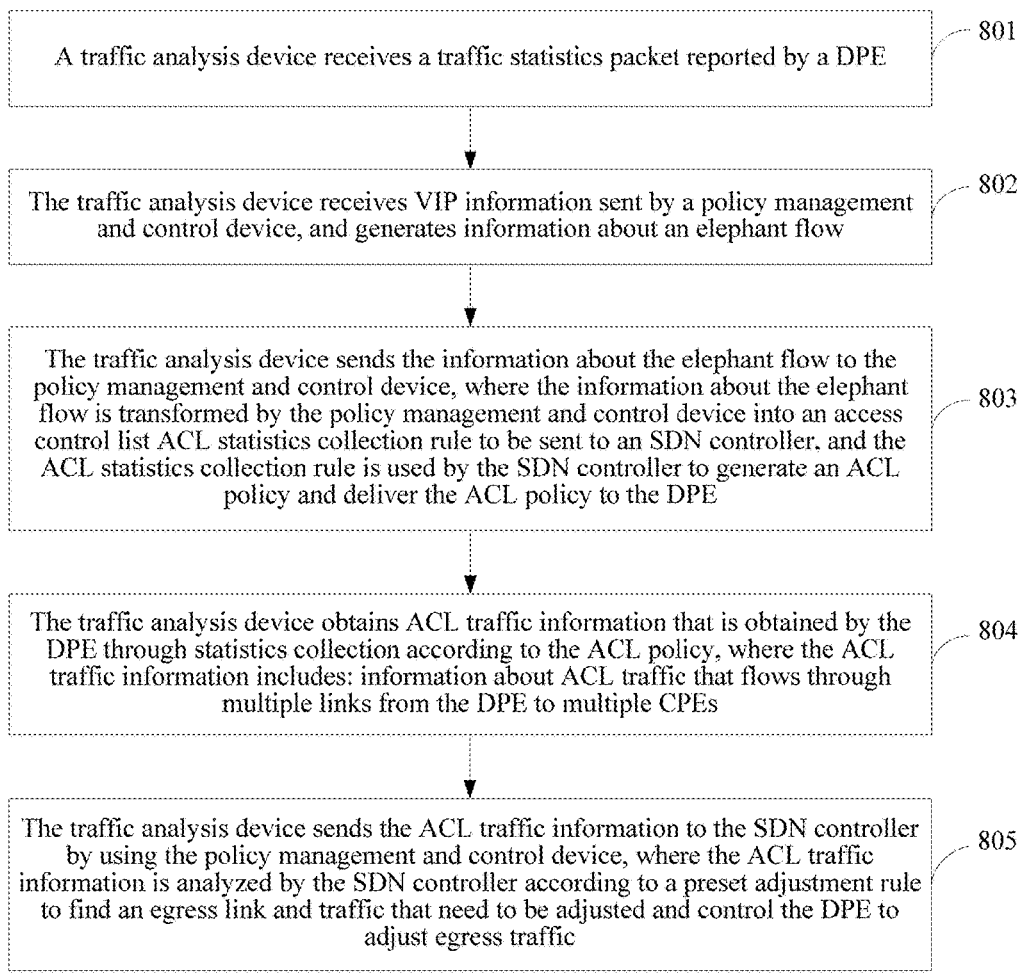
FIG. 8 is a flowchart of a method for performing balance adjustment on egress traffic of an SDN-based IDC network according to Embodiment 5 of the present disclosure.

Referring to FIG. 8, this embodiment of the present disclosure further provides a method for performing balance adjustment on egress traffic of an SDN-based IDC network, where the IDC network includes: a data center provider edge DPE, a traffic analysis device and an SDN controller that are connected to the DPE, and a policy management device connected to the traffic analysis device and the SDN controller; and the DPE is connected to multiple core network provider edges CPEs in a public network by using multiple egress links.

The method of this embodiment of the present disclosure is executed by the traffic analysis device, and the method may include:

801: The traffic analysis device receives a traffic statistics packet reported by the DPE.

802: The traffic analysis device receives VIP information sent by the policy management device, and generates information about an elephant flow, which specifically includes: filtering out VIP traffic flowing through an IP network segment of a network egress and indicated by the VIP information from the traffic statistics packet reported by the DPE, and then converging and sequencing remaining traffic in the traffic statistics packet according to destination prefixes, to obtain traffic of first N Internet protocol IP network segments with maximum traffic, where N is a positive integer, and the traffic of the first N IP network segments with maximum traffic is referred to as an elephant flow.

803: The traffic analysis device sends the information about the elephant flow to the policy management device, where the information about the elephant flow is converted by the policy management device into an access control list ACL statistics rule to be sent to the SDN controller, and the ACL statistics rule is used by the SDN controller to generate an ACL policy and deliver the ACL policy to the DPE.

804: The traffic analysis device obtains ACL traffic information that is obtained by the DPE through statistics collection according to the ACL policy, where the ACL traffic information includes: information about ACL traffic that flows through the multiple links from the DPE to the multiple CPEs.

805: The traffic analysis device sends the ACL traffic information to the SDN controller by using the policy management device, where the ACL traffic information is analyzed by the SDN controller according to a preset adjustment rule to find an egress link and traffic that need to be adjusted and control the DPE to adjust egress traffic.

The method of this embodiment is executed by the traffic analysis device. For a more detailed description of this embodiment of the present disclosure, refer to related content recorded in Embodiments 1 to 4.

In the foregoing embodiment, an elephant flow of an IP network segment of a network egress is identified, and precise traffic monitoring may be performed on the identified elephant flow (the IP network segment or a marked tenant) of the network egress by using an ACL. In some feasible implementation manners of the present disclosure, the following technical effects are achieved:

By performing traffic statistics collection and traffic adjustment according to an IP network segment, for egress traffic of an IDC network, real-time performance and precision of adjustment can be improved, so that blind adjustment without a basis can be avoided, and arbitrary adjustment according to false experience can be avoided.

Moreover, VIP traffic is filtered out, so that VIP clients are not affected when traffic adjustment is performed.

In addition, traffic of each IP network segment accounts for about 1% of total egress traffic, and by using the method of this embodiment of the present disclosure, a monitoring precision of 100% and an adjustment precision of about 1% can be implemented.

To better implement the foregoing solutions of the embodiments of the present disclosure, the following further provides related apparatuses configured to cooperate to implement the foregoing solutions.

Embodiment 6

Figure 9:
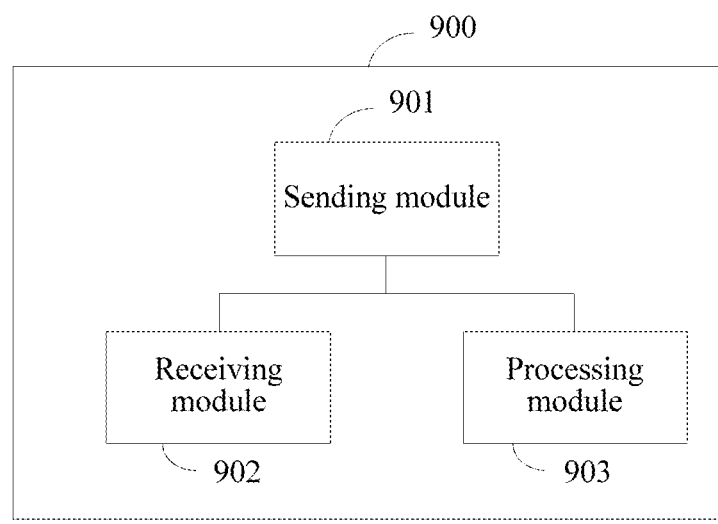
FIG. 9 is a schematic diagram of a policy management device according to Embodiment 6 of the present disclosure.

Referring to FIG. 9, this embodiment of the present disclosure provides a policy management device 900, used in an SDN-based IDC network, where the IDC network includes: a data center provider edge DPE, a traffic analysis device and an SDN controller that are connected to the DPE, and the policy management device; the policy management device is separately connected to the traffic analysis device and the SDN controller; and the DPE is connected to multiple core network provider edges CPEs in a public network by using multiple egress links, where the policy management device 900 may include:

a sending module 901, configured to send group information of at least one AS group to the SDN controller, where the group information is used by the SDN controller to generate an AS filtering policy and deliver the AS filtering policy to the DPE, and each AS group in the at least one AS group includes one or more ASs;

a receiving module 902, configured to obtain, by using the traffic analysis device, AS traffic information that is obtained by the DPE through statistics collection according to the AS filtering policy, where the AS traffic information includes: information about traffic of an AS group that flows through the multiple egress links from the DPE to the multiple CPEs; and a processing module 903, configured to generate a traffic adjustment policy according to the AS traffic information, where the traffic adjustment policy is used to instruct to adjust traffic of at least one destination AS group in the at least one AS group to at least one destination egress link in the multiple egress links, where the sending module 901 is further configured to send the traffic adjustment policy to the SDN controller, where the traffic adjustment policy is used by the SDN controller to control the DPE to adjust egress traffic.

In some embodiments of the present disclosure, the processing module 903 is specifically configured to display the AS traffic information to a system user; receive, by using the receiving module, AS traffic adjustment information entered by the system user; and convert the AS traffic adjustment information into the traffic adjustment policy.

In some other embodiments of the present disclosure, the processing module 903 is specifically configured to analyze the AS traffic information by using a preset policy rule, and generate the corresponding traffic adjustment policy. Optionally, the processing module 903 may include: a calculation unit, configured to calculate link bandwidth utilizations of the multiple egress links according to the AS traffic information; a search unit, configured to find an overloaded egress link whose link bandwidth utilization is greater than a first threshold that is set in the policy rule, and an underloaded egress link whose link bandwidth utilization is less than a second threshold that is set in the policy rule; a selection unit, configured to select traffic of a destination AS group from traffic of all AS groups on the overloaded egress link, and select a destination egress link from the underloaded egress link; and a generating unit, configured to generate the corresponding traffic adjustment policy, where the traffic adjustment policy is used to instruct to adjust the traffic of the destination AS group to the destination egress link.

In some embodiments of the present disclosure, the sending module is further configured to send VIP information to the traffic analysis device, and receive information about an elephant flow and reported by the traffic analysis device, where the elephant flow is traffic, of first N Internet protocol IP network segments with maximum traffic, obtained by the traffic analysis device by filtering out VIP traffic flowing through an IP network segment of a network egress and indicated by the VIP information from a traffic statistics packet reported by the DPE, and then converging and sequencing remaining traffic in the traffic statistics packet according to destination prefixes, where N is a positive integer;

the processing module is further configured to convert the information about the elephant flow into an access control list ACL statistics rule, and send the ACL statistics rule to the SDN controller, where the ACL statistics rule is used by the SDN controller to generate an ACL policy and deliver the ACL policy to the DPE;

the receiving module is further configured to obtain, by using the traffic analysis device, ACL traffic information that is obtained by the DPE through statistics collection according to the ACL policy, where the ACL traffic information includes: information about ACL traffic that flows through the multiple egress links from the DPE to the multiple CPEs; and the sending module is further configured to send the ACL traffic information to the SDN controller, where the ACL traffic information is analyzed by the SDN controller according to a preset adjustment rule to find an egress link and traffic that need to be adjusted and control the DPE to adjust egress traffic.

It may be understood that, functions of the functional modules of the policy management device in this embodiment of the present disclosure may be specifically implemented according to the methods in the foregoing method embodiments. For specific implementation processes, reference may be made to related descriptions in the foregoing method embodiments, and details are not described herein again.

It can be seen from above that, in some feasible implementation manners of the present disclosure, a policy management device is provided, and by performing traffic statistics collection and traffic adjustment according to an AS group, for egress traffic of an IDC network, real-time performance and precision of adjustment can be improved, so that blind adjustment without a basis can be avoided, and arbitrary adjustment according to false experience can be avoided.

Embodiment 7

Figure 10:
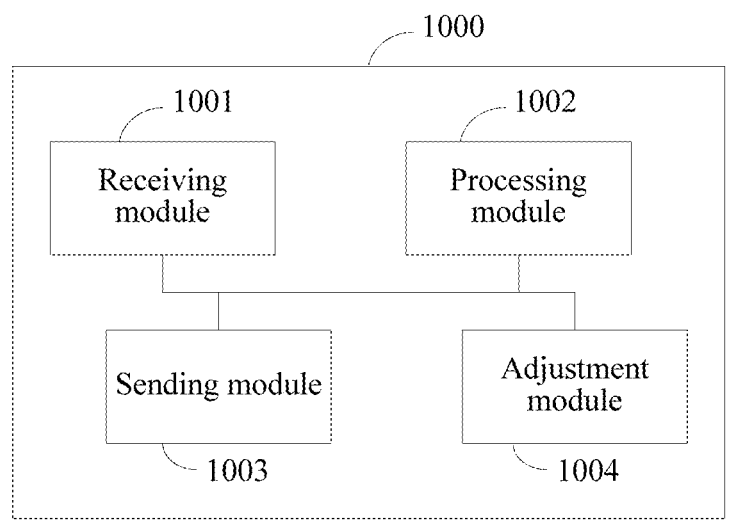
FIG. 10 is a schematic diagram of an SDN controller according to Embodiment 7 of the present disclosure.

Referring to FIG. 10, this embodiment of the present disclosure provides an SDN controller 1000, used in an SDN-based IDC network, where the IDC network includes: a data center provider edge DPE, a traffic analysis device and the SDN controller that are connected to the DPE, and a policy management device connected to the traffic analysis device and the SDN controller; and the DPE is connected to multiple core network provider edges CPEs in a public network by using multiple egress links, where the SDN controller 1000 may include:

a receiving module 1001, configured to receive group information of at least one AS group sent by the policy management device, where each AS group in the at least one AS group includes one or more ASs;

a processing module 1002, configured to generate an AS filtering policy according to the group information;

a sending module 1003, configured to deliver the AS filtering policy to the DPE, where the AS filtering policy is used by the DPE to collect statistics to obtain AS traffic information, and the AS traffic information includes: information about traffic of an AS group that flows through the multiple egress links from the DPE to the multiple CPEs, where the receiving module 1001 is further configured to receive a traffic adjustment policy sent by the policy management device, where the traffic adjustment policy is generated by the policy management device after the policy management device obtains the AS traffic information by using the traffic analysis device, and the traffic adjustment policy is used to instruct to adjust traffic of at least one destination AS group in the at least one AS group to at least one destination egress link in the multiple egress links; and an adjustment module 1004, configured to control, according to the traffic adjustment policy, the DPE to adjust egress traffic.

In some embodiments of the present disclosure, the receiving module 1001 is further configured to receive an ACL statistics rule sent by the policy management device, and generate an ACL policy and deliver the ACL policy to the DPE, where the ACL policy is used by the DPE to collect statistics to obtain ACL traffic information, and the ACL traffic information includes: information about ACL traffic that flows through the multiple links from the DPE to the multiple CPEs;

the receiving module 1001 is further configured to obtain, by using the traffic analysis device, ACL traffic information that is obtained by the DPE through statistics collection; and the adjustment module 1004 is further configured to analyze the ACL traffic information by using a preset adjustment rule, to find an egress link and traffic that need to be adjusted and control the DPE to adjust egress traffic.

It may be understood that, functions of the functional modules of the SDN controller in this embodiment of the present disclosure may be specifically implemented according to the methods in the foregoing method embodiments. For specific implementation processes, reference may be made to related descriptions in the foregoing method embodiments, and details are not described herein again.

It can be seen from above that, in some feasible implementation manners of the present disclosure, an SDN controller is disclosed, and by performing traffic statistics collection and traffic adjustment according to an AS group, for egress traffic of an IDC network, real-time performance and precision of adjustment can be improved, so that blind adjustment without a basis can be avoided, and arbitrary adjustment according to false experience can be avoided.

Embodiment 8

Figure 11:
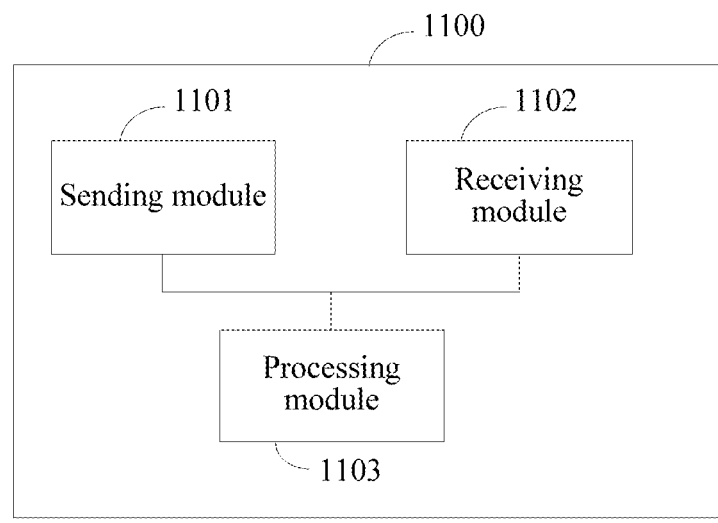
FIG. 11 is a schematic diagram of a policy management device according to Embodiment 8 of the present disclosure.

Referring to FIG. 11, this embodiment of the present disclosure provides a policy management device 1100, used in an SDN-based IDC network, where the IDC network includes: a data center provider edge DPE, a traffic analysis device and an SDN controller that are connected to the DPE, and the policy management device connected to the traffic analysis device and the SDN controller; and the DPE is connected to multiple core network provider edges CPEs in a public network by using multiple egress links, where the policy management device 1100 may include:

a sending module 1101, configured to send VIP information to the traffic analysis device;

a receiving module 1102, configured to receive information about an elephant flow and reported by the traffic analysis device, where the elephant flow is traffic, of first N Internet protocol IP network segments with maximum traffic, obtained by the traffic analysis device by filtering out VIP traffic flowing through an IP network segment of a network egress and indicated by the VIP information from a traffic statistics packet reported by the DPE, and then converging and sequencing remaining traffic in the traffic statistics packet according to destination prefixes, where N is a positive integer; and a processing module 1103, configured to convert the information about the elephant flow into an access control list ACL statistics rule, where the sending module 1101 is further configured to send the ACL statistics rule to the SDN controller, where the ACL statistics rule is used by the SDN controller to generate an ACL policy and deliver the ACL policy to the DPE;

the receiving module 1102 is further configured to obtain, by using the traffic analysis device, ACL traffic information that is obtained by the DPE through statistics collection according to the ACL policy, where the ACL traffic information includes: information about ACL traffic that flows through the multiple egress links from the DPE to the multiple CPEs; and the sending module 1101 is further configured to send the ACL traffic information to the SDN controller, where the ACL traffic information is analyzed by the SDN controller according to a preset adjustment rule to find an egress link and traffic that need to be adjusted and control the DPE to adjust egress traffic.

It may be understood that, functions of the functional modules of the policy management device in this embodiment of the present disclosure may be specifically implemented according to the methods in the foregoing method embodiments. For specific implementation processes, reference may be made to related descriptions in the foregoing method embodiments, and details are not described herein again.

It can be seen from above that, in some feasible implementation manners of the present disclosure, a policy management device is disclosed, and by performing traffic statistics collection and traffic adjustment according to an IP network segment, for egress traffic of an IDC network, real-time performance and precision of adjustment can be improved, so that blind adjustment without a basis can be avoided, and arbitrary adjustment according to false experience can be avoided.

Embodiment 9

Figure 12:
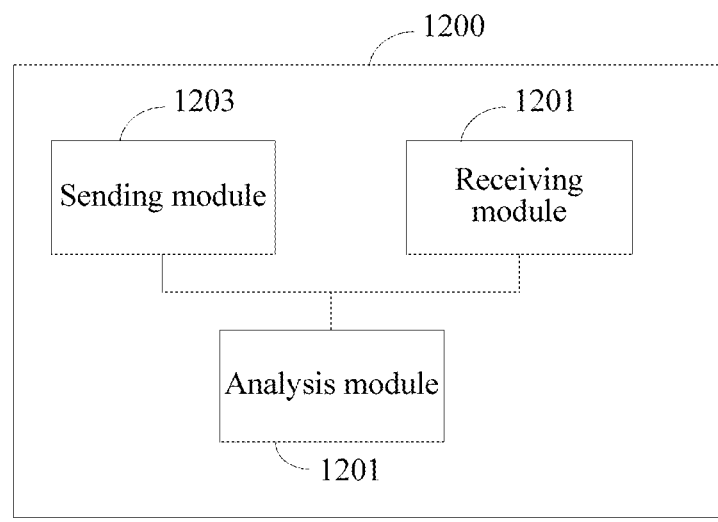
FIG. 12 is a schematic diagram of a traffic analysis device according to Embodiment 9 of the present disclosure.

Referring to FIG. 12, this embodiment of the present disclosure provides a traffic analysis device 1200, used in an SDN-based IDC network, where the IDC network includes: a data center provider edge DPE, the traffic analysis device and an SDN controller that are connected to the DPE, and a policy management device connected to the traffic analysis device and the SDN controller; and the DPE is connected to multiple core network provider edges CPEs in a public network by using multiple egress links, where the traffic analysis device 1200 may include:

a receiving module 1201, configured to receive a traffic statistics packet reported by the DPE, where the receiving module 1201 is further configured to receive VIP information sent by the policy management device;

an analysis module 1202, configured to filter out VIP traffic flowing through an IP network segment of a network egress and indicated by the VIP information from the traffic statistics packet reported by the DPE, and then converge and sequence on remaining traffic in the traffic statistics packet according to destination prefixes, to obtain traffic of first N Internet protocol IP network segments with maximum traffic, where N is a positive integer, and the traffic of the first N IP network segments with maximum traffic is referred to as an elephant flow; and a sending module 1203, configured to send information about the elephant flow to the policy management device, where the information about the elephant flow is converted by the policy management device into an access control list ACL statistics rule to be sent to the SDN controller, and the ACL statistics rule is used by the SDN controller to generate an ACL policy and deliver the ACL policy to the DPE, where the receiving module 1201 is further configured to obtain ACL traffic information that is obtained by the DPE through statistics collection according to the ACL policy, where the ACL traffic information includes: information about ACL traffic that flows through the multiple links from the DPE to the multiple CPEs; and the sending module 1203 is further configured to send the ACL traffic information to the SDN controller by using the policy management device, where the ACL traffic information is analyzed by the SDN controller according to a preset adjustment rule to find a link and traffic that need to be adjusted and control the DPE to adjust egress traffic.

It may be understood that, functions of the functional modules of the traffic analysis device in this embodiment of the present disclosure may be specifically implemented according to the methods in the foregoing method embodiments. For specific implementation processes, reference may be made to related descriptions in the foregoing method embodiments, and details are not described herein again.

It can be seen from above that, in some feasible implementation manners of the present disclosure, a traffic analysis device is disclosed, and by performing traffic statistics collection and traffic adjustment according to an IP network segment, for egress traffic of an IDC network, real-time performance and precision of adjustment can be improved, so that blind adjustment without a basis can be avoided, and arbitrary adjustment according to false experience can be avoided.

This embodiment of the present disclosure further provides a computer storage medium, where the computer storage medium may store a program. When executed, the program includes some or all of steps of the method for performing balance adjustment on egress traffic of an SDN-based IDC network that is recorded in the foregoing Method Embodiment 1 or Embodiment 2 or Embodiment 3 or Embodiment 4.

Figure 13:
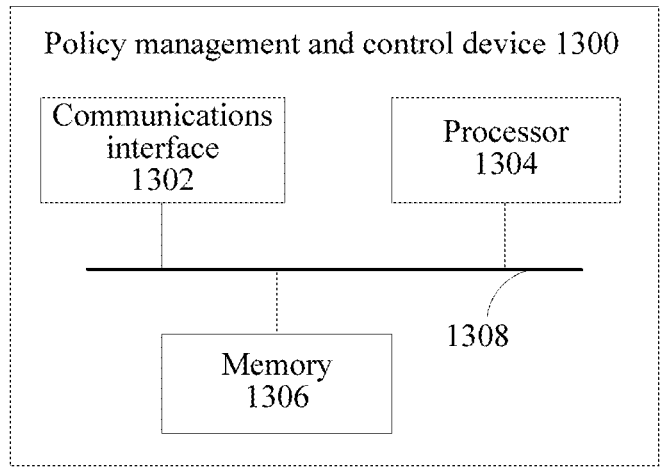
FIG. 13 is a schematic diagram of a policy management device according to an embodiment of the present disclosure.

Referring to FIG. 13, this embodiment of the present disclosure further provides a policy management device 1300.

The policy management device 1300 may be a computer device, for example, a server. The policy management device 1300 includes: a processor 1304, a memory 1306, a communications interface 1302, and a bus 1308. The processor 1304, the memory 1306, and the communications interface 1302 are connected and complete mutual communication by using the bus 1308.

The bus 1308 may be an industry standard architecture (ISA) bus, a peripheral component interconnect (PCI) bus, an extended industry standard architecture (EISA) bus, or the like. The bus may be classified into one or more of an address bus, a data bus, and a control bus. For ease of representation, the bus is represented by using only one bold line in FIG. 13, but it does not mean that there is only one bus or one type of bus.

The memory 1306 is configured to store executable program code, where the program code includes a computer operation instruction. When the policy management device 1300 executes the program code, the policy management device 1300 may complete steps 301 to 304 in Embodiment 1, or may implement all functions of the policy management device 900 in Embodiment 6. The memory 1306 may include a high speed RAM (Random Access Memory). Optionally, the memory 1306 may further include a non-volatile memory. For example, the memory 1306 may include a magnetic disk memory.

The processor 1304 may be a central processing unit (CPU), or the processor 1304 may be an application specific integrated circuit (ASIC), or the processor 1304 may be configured into one or more integrated circuits to implement the embodiments of the present disclosure.

The communications interface 1302 may be configured to send group information of preset at least one autonomous system AS group to an SDN controller, where the group information is used by the SDN controller to generate an AS filtering policy and deliver the AS filtering policy to a DPE, and each AS group in the at least one AS group includes one or more ASs; and obtain, by using a traffic analysis device, AS traffic information that is obtained by the DPE through statistics collection according to the AS filtering policy, where the AS traffic information includes: information about traffic of an AS group that flows through multiple egress links from the DPE to multiple CPEs;

the processor 1304 may be configured to generate a traffic adjustment policy according to the AS traffic information, where the traffic adjustment policy is used to instruct to adjust traffic of at least one destination AS group in the at least one AS group to at least one destination egress link in the multiple egress links; and the communications interface 1302 is further configured to send the traffic adjustment policy to the SDN controller, where the traffic adjustment policy is used by the SDN controller to control the DPE to adjust egress traffic.

Optionally, the processor 1304 is further configured to display the AS traffic information to a system user by using a display apparatus; receive, by using the communications interface 1302, AS traffic adjustment information entered by the system user; and convert the AS traffic adjustment information into the traffic adjustment policy.

Optionally, the processor 1304 is further configured to analyze the AS traffic information by using a preset policy rule, and generate the corresponding traffic adjustment policy.

Optionally, the processor 1304 is further configured to calculate link bandwidth utilizations of the multiple egress links according to the AS traffic information; find an overloaded egress link whose link bandwidth utilization is greater than a first threshold that is set in the policy rule, and an underloaded egress link whose link bandwidth utilization is less than a second threshold that is set in the policy rule; select traffic of a destination AS group from traffic of all AS groups on the overloaded egress link, and select a destination egress link from the underloaded egress link; and generate the corresponding traffic adjustment policy, where the traffic adjustment policy is used to instruct to adjust the traffic of the destination AS group to the destination egress link.

Optionally, the communications interface 1302 is further configured to send VIP information to the traffic analysis device, and receive information about an elephant flow and reported by the traffic analysis device, where the elephant flow is traffic, of first N Internet protocol IP network segments with maximum traffic, obtained by the traffic analysis device by filtering out VIP traffic flowing through an IP network segment of a network egress and indicated by the VIP information from a traffic statistics packet reported by the DPE, and then converging and sequencing remaining traffic in the traffic statistics packet according to destination prefixes, where N is a positive integer; the processor 1304 is further configured to convert the information about the elephant flow into an access control list ACL statistics rule; and the communications interface 1302 is further configured to send the ACL statistics rule to the SDN controller, where the ACL statistics rule is used by the SDN controller to generate an ACL policy and deliver the ACL policy to the DPE; the communications interface 1302 is further configured to obtain, by using the traffic analysis device, ACL traffic information that is obtained by the DPE through statistics collection according to the ACL policy, where the ACL traffic information includes: information about ACL traffic that flows through the multiple egress links from the DPE to the multiple CPEs; and the communications interface 1302 is further configured to send the ACL traffic information to the SDN controller, where the ACL traffic information is analyzed by the SDN controller according to a preset adjustment rule to find an egress link and traffic that need to be adjusted and control the DPE to adjust egress traffic.

It should be noted that, functional units of the policy management device provided in this embodiment of the present disclosure may be specific implementation based on the method provided in Embodiment 1 and functions of the apparatus provided in Embodiment 6, definitions and descriptions of terms are the same as those in Embodiment 1 and Embodiment 6, and details are not described herein again.

This embodiment of the present disclosure provides a policy management device, and by performing traffic adjustment according to an AS group, for egress traffic of an IDC network, real-time performance and precision of adjustment can be improved, so that blind adjustment without a basis can be avoided, and arbitrary adjustment according to false experience can be avoided.

Figure 14:
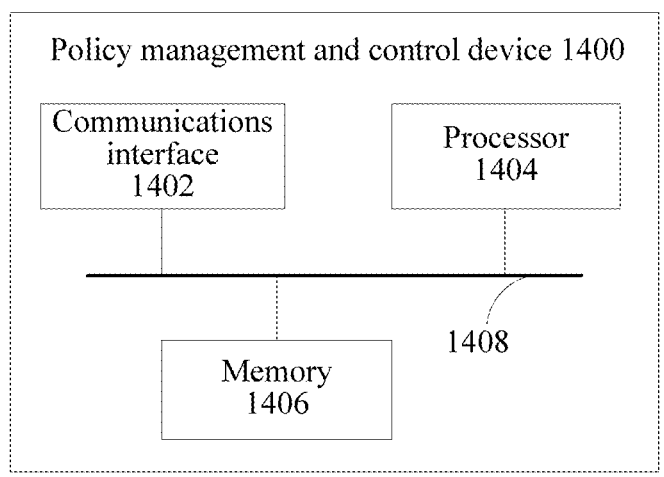
FIG. 14 is a schematic diagram of a policy management device according to an embodiment of the present disclosure.

Referring to FIG. 14, this embodiment of the present disclosure further provides a policy management device 1400.

The policy management device 1400 may be a computer device, for example, a server. The policy management device 1400 includes: a processor 1404, a memory 1406, a communications interface 1408, and a bus 1404. The processor 1404, the memory 1406, and the communications interface 1402 are connected and complete mutual communication by using the bus 1408.

The bus 1408 may be an industry standard architecture (ISA) bus, a peripheral component interconnect (PCI) bus, an extended industry standard architecture (EISA) bus, or the like. The bus may be classified into one or more of an address bus, a data bus, and a control bus. For ease of representation, the bus is represented by using only one bold line in FIG. 14, but it does not mean that there is only one bus or one type of bus.

The memory 1406 is configured to store executable program code, where the program code includes a computer operation instruction. When the policy management device 1400 executes the program code, the policy management device 1400 may complete steps 501 to 504 in Embodiment 2, or may implement all functions of the policy management device 1100 in Embodiment 8. The memory 1406 may include a high speed RAM (Ramdom Access Memory). Optionally, the memory 1406 may further include a non-volatile memory. For example, the memory 1406 may include a magnetic disk memory.

The processor 1404 may be a central processing unit (CPU), or the processor 1404 may be an application specific integrated circuit (ASIC), or the processor 1404 may be configured into one or more integrated circuits to implement the embodiments of the present disclosure.

The communications interface 1402 is configured to send VIP information to a traffic analysis device, and receive information about an elephant flow reported by the traffic analysis device, where the elephant flow is traffic, of first N Internet protocol IP network segments with maximum traffic, obtained by the traffic analysis device by filtering out VIP traffic flowing through an IP network segment of a network egress and indicated by the VIP information from a traffic statistics packet reported by a DPE, and then converging and sequencing remaining traffic in the traffic statistics packet according to destination prefixes, where N is a positive integer;

the processor 1404 is configured to convert the information about the elephant flow into an ACL statistics rule;

the communications interface 1402 is further configured to send the ACL statistics rule to an SDN controller, where the ACL statistics rule is used by the SDN controller to generate an ACL policy and deliver the ACL policy to the DPE; and the communications interface 1402 is further configured to obtain, by using the traffic analysis device, ACL traffic information that is obtained by the DPE through statistics collection according to the ACL policy, where the ACL traffic information includes: information about ACL traffic that flows through multiple egress links from the DPE to multiple CPEs; and send the ACL traffic information to the SDN controller, where the ACL traffic information is analyzed by the SDN controller according to a preset adjustment rule to find an egress link and traffic that need to be adjusted and control the DPE to adjust egress traffic.

It should be noted that, functional units of the policy management device provided in this embodiment of the present disclosure may be specific implementation based on the method provided in Embodiment 2 and functions of the apparatus provided in Embodiment 8, definitions and descriptions of terms are the same as those in Embodiment 2 and Embodiment 8, and details are not described herein again.

This embodiment of the present disclosure provides a policy management device, and by performing traffic statistics collection and traffic adjustment according to an IP network segment, for egress traffic of an IDC network, real-time performance and precision of adjustment can be improved, so that blind adjustment without a basis can be avoided, and arbitrary adjustment according to false experience can be avoided.

Figure 15:
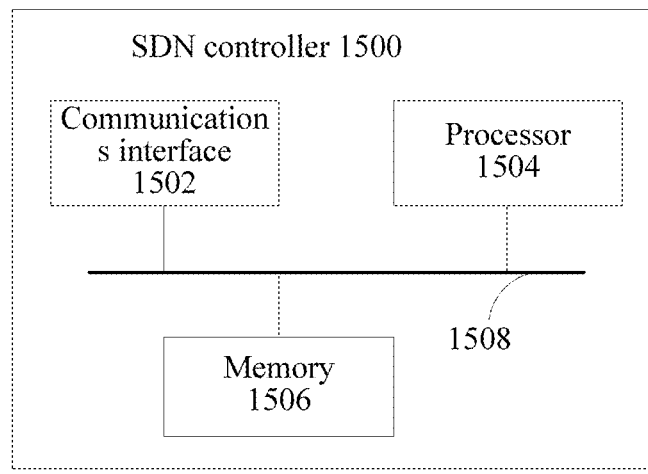
FIG. 15 is a schematic diagram of an SDN controller according to an embodiment of the present disclosure.

Referring to FIG. 15, this embodiment of the present disclosure further provides an SDN controller 1500.

The SDN controller 1500 may be a computer device, for example, a server. The SDN controller 1500 includes: a processor 1504, a memory 1506, a communications interface 1502, and a bus 1508. The processor 1504, the memory 1506, and the communications interface 1502 are connected and complete mutual communication by using the bus 1508.

The bus 1508 may be an industry standard architecture (ISA) bus, a peripheral component interconnect (PCI) bus, an extended industry standard architecture (EISA) bus, or the like. The bus may be classified into one or more of an address bus, a data bus, and a control bus. For ease of representation, the bus is represented by using only one bold line in FIG. 15, but it does not mean that there is only one bus or one type of bus.

The memory 1506 is configured to store executable program code, where the program code includes a computer operation instruction. When the SDN controller 1500 executes the program code, the SDN controller 1500 may complete steps 701 to 704 in Embodiment 4, or may implement all functions of the SDN controller 1100 in Embodiment 7. The memory 1506 may include a high speed RAM (Ramdom Access Memory). Optionally, the memory 1506 may further include a non-volatile memory. For example, the memory 1506 may include a magnetic disk memory.

The processor 1504 may be a central processing unit (CPU), or the processor 1504 may be an application specific integrated circuit (ASIC), or the processor 1504 may be configured into one or more integrated circuits to implement the embodiments of the present disclosure.

The communications interface 1502 may be configured to receive group information of at least one autonomous system AS group sent by a policy management device, where each AS group in the at least one AS group includes one or more ASs;

the processor 1504 may be configured to generate an AS filtering policy according to the group information;

the communications interface 1502 is further configured to deliver the AS filtering policy to a DPE, where the AS filtering policy is used by the DPE to collect statistics to obtain AS traffic information, and the AS traffic information includes: information about traffic of an AS group that flows through multiple egress links from the DPE to multiple CPEs; and receive a traffic adjustment policy sent by a policy management device, where the traffic adjustment policy is generated by the policy management device after the policy management device obtains the AS traffic information by using a traffic analysis device, and the traffic adjustment policy is used to instruct to adjust traffic of at least one destination AS group in the at least one AS group to at least one destination egress link in the multiple egress links; and the processor 1504 is further configured to control, according to the traffic adjustment policy, the DPE to adjust egress traffic.

Optionally, the communications interface 1502 is further configured to receive an ACL statistics rule sent by the policy management device; the processor 1504 is further configured to generate an ACL policy; the communications interface 1502 is further configured to deliver the ACL policy to the DPE, where the ACL policy is used by the DPE to collect statistics to obtain ACL traffic information, and the ACL traffic information includes: information about ACL traffic that flows through the multiple links from the DPE to the multiple CPEs; and obtain, by using the traffic analysis device, ACL traffic information that is obtained by the DPE through statistics collection; and the processor 1504 is further configured to analyze the ACL traffic information according to a preset adjustment rule, to find an egress link and traffic that need to be adjusted and control the DPE to adjust egress traffic.

It should be noted that, functional units of the SDN controller provided in this embodiment of the present disclosure may be specific implementation based on the method provided in Embodiment 4 and functions of the apparatus provided in Embodiment 7, definitions and descriptions of terms are the same as those in Embodiment 4 and Embodiment 7, and details are not described herein again.

This embodiment of the present disclosure provides an SDN controller, and by performing traffic statistics collection and traffic adjustment according to an AS group by using the SDN controller, for egress traffic of an IDC network, real-time performance and precision of adjustment can be improved, so that blind adjustment without a basis can be avoided, and arbitrary adjustment according to false experience can be avoided.

Figure 16:
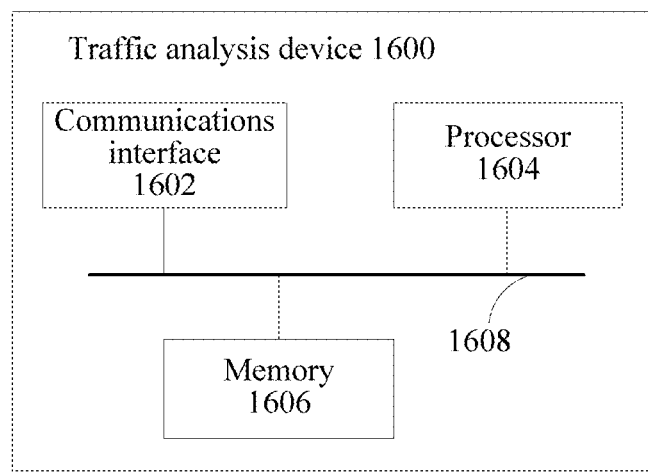
FIG. 16 is a schematic diagram of a traffic analysis device according to an embodiment of the present disclosure.

Referring to FIG. 16, this embodiment of the present disclosure further provides a traffic analysis device 1600.

The traffic analysis device 1600 may be a computer device, for example, a server. The traffic analysis device 1600 includes: a processor 1604, a memory 1606, a communications interface 1602, and a bus 1608. The processor 1604, the memory 1606, and the communications interface 1602 are connected and complete mutual communication by using the bus 1608.

The bus 1608 may be an industry standard architecture (ISA) bus, a peripheral component interconnect (PCI) bus, an extended industry standard architecture (EISA) bus, or the like. The bus may be classified into one or more of an address bus, a data bus, and a control bus. For ease of representation, the bus is represented by using only one bold line in FIG. 16, but it does not mean that there is only one bus or one type of bus.

The memory 1606 is configured to store executable program code, where the program code includes a computer operation instruction. When the traffic analysis device 1600 executes the program code, the traffic analysis device 1600 may complete steps 801 to 805 in Embodiment 5, or may implement all functions of the SDN controller 1200 in Embodiment 9. The memory 1606 may include a high speed RAM (Ramdom Access Memory). Optionally, the memory 1606 may further include a non-volatile memory. For example, the memory 1606 may include a magnetic disk memory.

The processor 1604 may be a central processing unit (CPU), or the processor 1604 may be an application specific integrated circuit (ASIC), or the processor 1604 may be configured into one or more integrated circuits to implement the embodiments of the present disclosure.

The communications interface 1602 may be configured to receive a traffic statistics packet reported by a DPE; and receive VIP information sent by a policy management device;

the processor 1604 may be configured to filter out VIP traffic flowing through an IP network segment of a network egress and indicated by the VIP information from the traffic statistics packet reported by the DPE, and then converge and sequence on remaining traffic in the traffic statistics packet according to destination prefixes, to obtain traffic of first N Internet protocol IP network segments with maximum traffic, where N is a positive integer, and the traffic of the first N IP network segments with maximum traffic is referred to as an elephant flow;

the communications interface 1602 is further configured to send information about the elephant flow to the policy management device, where the information about the elephant flow is converted by the policy management device into an ACL statistics rule to be sent to an SDN controller, and the ACL statistics rule is used by the SDN controller to generate an ACL policy and deliver the ACL policy to the DPE;

the communications interface 1602 is further configured to obtain ACL traffic information that is obtained by the DPE through statistics collection according to the ACL policy, where the ACL traffic information includes: information about ACL traffic that flows through multiple links from the DPE to multiple CPEs; and the communications interface 1602 is further configured to send the ACL traffic information to the SDN controller by using the policy management device, where the ACL traffic information is analyzed by the SDN controller according to a preset adjustment rule to find an egress link and traffic that need to be adjusted and control the DPE to adjust egress traffic.

It should be noted that, functional units of the traffic analysis device provided in this embodiment of the present disclosure may be specific implementation based on the method provided in Embodiment 5 and functions of the apparatus provided in Embodiment 9, definitions and descriptions of terms are the same as those in Embodiment 5 and Embodiment 9, and details are not described herein again.

This embodiment of the present disclosure provides a traffic analysis device, and by performing traffic statistics collection and traffic adjustment according to an IP network segment, for egress traffic of an IDC network, real-time performance and precision of adjustment can be improved, so that blind adjustment without a basis can be avoided, and arbitrary adjustment according to false experience can be avoided.

Figure 17:
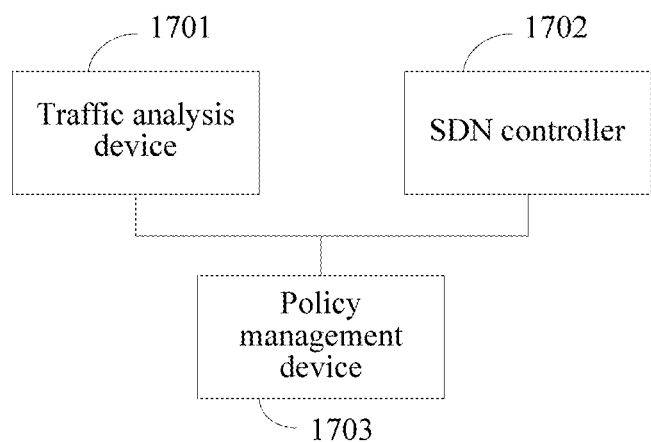
FIG. 17 is a schematic diagram of a system for performing balance adjustment on egress traffic of an SDN-based IDC network according to an embodiment of the present disclosure.

Referring to FIG. 17, this embodiment of the present disclosure further provides a system for performing balance adjustment on egress traffic of an SDN-based IDC network, where the system includes a data center provider edge DPE, a traffic analysis device 1701 and an SDN controller 1702 that are connected to the DPE, and a policy management device 1703 connected to the traffic analysis device and the SDN controller; and the DPE is connected to multiple core network provider edges CPEs in a public network by using multiple egress links, where the policy management device 1703 is configured to send group information of preset at least one autonomous system AS group to the SDN controller, where the group information is used by the SDN controller to generate an AS filtering policy and deliver the AS filtering policy to the DPE, and each AS group in the at least one AS group includes one or more egress destination ASs; obtain, by using the traffic analysis device, AS traffic information that is obtained by the DPE through statistics collection according to the AS filtering policy, where the AS traffic information includes: information about traffic of an AS group that flows through the multiple egress links from the DPE to the multiple CPEs; generate a traffic adjustment policy according to the AS traffic information, where the traffic adjustment policy is used to instruct to adjust traffic of at least one destination AS group in the at least one AS group to at least one destination egress link in the multiple egress links; and send the traffic adjustment policy to the SDN controller, where the traffic adjustment policy is used by the SDN controller to control the DPE to adjust egress traffic;

the SDN controller 1702 is configured to receive the group information of the at least one autonomous system AS group sent by the policy management device, and generate the AS filtering policy according to the group information and deliver the AS filtering policy to the DPE, where the AS filtering policy is used by the DPE to collect statistics to obtain the AS traffic information; receive the traffic adjustment policy sent by the policy management device; and control, according to the traffic adjustment policy, the DPE to adjust egress traffic; and the traffic analysis device 1701 is configured to obtain the AS traffic information that is obtained by the DPE through statistics collection according to the AS filtering policy, where the AS traffic information includes: the information about traffic of the AS group that flows through the multiple egress links from the DPE to the multiple CPEs; and report the AS traffic information to the policy management device.

This embodiment of the present disclosure provides a system for performing balance adjustment on egress traffic of an SDN-based IDC network, and by performing traffic statistics collection and traffic adjustment according to an AS group, for egress traffic of an IDC network, real-time performance and precision of adjustment can be improved, so that blind adjustment without a basis can be avoided, and arbitrary adjustment according to false experience can be avoided.

In the foregoing embodiments, the description of each embodiment has respective focuses. For a part that is not described in detail in an embodiment, reference may be made to related descriptions in other embodiments.

It should be noted that, for ease of description, the foregoing method embodiments are described as a series of action combinations. However, a person skilled in the art should understand that the present disclosure is not limited to the described sequence of the actions, because some steps may be performed in another sequence or performed at the same time according to the present disclosure. In addition, a person skilled in the art should also understand that the embodiments described in this specification all belong to exemplary embodiments, and the involved actions and modules are not necessarily mandatory to the present disclosure.

A person of ordinary skill in the art may understand that all or a part of the steps of the methods in the embodiments may be implemented by a program instructing relevant hardware. The program may be stored in a computer readable storage medium. The storage medium may include: a ROM, a RAM, a magnetic disk, or an optical disc.

The method, the device, and the system for performing balance adjustment on egress traffic of an SDN-based IDC network provided in the embodiments of the present disclosure are described above in detail. Although the principles and implementation manners of the present disclosure are described in this specification by using specific examples, the descriptions of the embodiments are only intended to help understand the method and core ideas of the present disclosure. Meanwhile, a person of ordinary skill in the art may make modifications to the specific implementation manners and application scopes according to the ideas of the present disclosure. To conclude, the content of the specification should not be construed as a limitation to the present disclosure.

What is claimed is:

1. A method for performing balance adjustment on egress traffic of a software-defined networking (SDN)-based Internet data center (IDC) network, wherein the IDC network comprises: a data center provider edge (DPE), a traffic analysis device and an SDN controller that are connected to the DPE, a policy management device connected to the traffic analysis device and the SDN controller, wherein the DPE is connected to multiple core network provider edges (CPEs) in a public network by using multiple egress links, the method comprising:

sending, by the policy management device, group information of at least one autonomous system (AS) group to the SDN controller for generating an AS filtering policy for delivery to the DPE, wherein each AS group in the at least one AS group comprises one or more ASs;

obtaining, by using the traffic analysis device, AS traffic information that is obtained by the DPE through statistics collection according to the AS filtering policy, wherein the AS traffic information comprises: information about traffic of an AS group that flows through the multiple egress links from the DPE to the multiple CPEs;

generating a traffic adjustment policy according to the AS traffic information for instructing to adjust traffic of at least one destination AS group in the at least one AS group to at least one destination egress link in the multiple egress links; and sending the traffic adjustment policy to the SDN controller for controlling the DPE to adjust egress traffic.

2. The method according to claim 1, wherein generating a traffic adjustment policy according to the AS traffic information comprises:

displaying the AS traffic information to a system user;

receiving AS traffic adjustment information entered by the system user; and converting the AS traffic adjustment information into the traffic adjustment policy.

3. The method according to claim 1, wherein generating a traffic adjustment policy according to the AS traffic information comprises:

analyzing the AS traffic information by using a preset policy rule, and generating the corresponding traffic adjustment policy.

4. The method according to claim 3, wherein analyzing the AS traffic information by using a preset policy rule, and generating the corresponding traffic adjustment policy comprises:

calculating link bandwidth utilizations of the multiple egress links according to the AS traffic information;

finding an overloaded egress link whose link bandwidth utilization is greater than a first threshold that is set in the policy rule, and an underloaded egress link whose link bandwidth utilization is less than a second threshold that is set in the policy rule;

selecting traffic of a destination AS group from traffic of all AS groups on the overloaded egress link, and selecting a destination egress link from the underloaded egress link; and generating the corresponding traffic adjustment policy for instructing to adjust the traffic of the destination AS group to the destination egress link.

5. The method according to claim 1, wherein after sending the traffic adjustment policy to the SDN controller, the method further comprises:

sending, by the policy management device, VIP information to the traffic analysis device, and receiving information about an elephant flow and reported by the traffic analysis device, wherein the elephant flow is traffic, of first N Internet protocol (IP) network segments with maximum traffic, obtained by the traffic analysis device by filtering out VIP traffic flowing through an IP network segment of a network egress and indicated by the VIP information from a traffic statistics packet reported by the DPE, and then converging and sequencing remaining traffic in the traffic statistics packet according to destination prefixes, wherein N is a positive integer;

converting the information about the elephant flow into an access control list (ACL) statistics rule, and sending the ACL statistics rule to the SDN controller for generating an ACL policy for delivery to the DPE;

obtaining, by using the traffic analysis device, ACL traffic information that is obtained by the DPE through statistics collection according to the ACL policy, wherein the ACL traffic information comprises: information about ACL traffic that flows through the multiple egress links from the DPE to the multiple CPEs; and sending the ACL traffic information to the SDN controller, wherein the ACL traffic information is analyzed by the SDN controller according to a preset adjustment rule to find an egress link and traffic that need to be adjusted and control the DPE to adjust egress traffic.

6. The method according to claim 2, wherein after sending the traffic adjustment policy to the SDN controller, the method further comprises:

sending, by the policy management device, VIP information to the traffic analysis device, and receiving information about an elephant flow and reported by the traffic analysis device, wherein the elephant flow is traffic, of first N Internet protocol (IP) network segments with maximum traffic, obtained by the traffic analysis device by filtering out VIP traffic flowing through an IP network segment of a network egress and indicated by the VIP information from a traffic statistics packet reported by the DPE, and then converging and sequencing remaining traffic in the traffic statistics packet according to destination prefixes, wherein N is a positive integer;

converting the information about the elephant flow into an access control list (ACL) statistics rule, and sending the ACL statistics rule to the SDN controller for generating an ACL policy for delivery to the DPE;

obtaining, by using the traffic analysis device, ACL traffic information that is obtained by the DPE through statistics collection according to the ACL policy, wherein the ACL traffic information comprises: information about ACL traffic that flows through the multiple egress links from the DPE to the multiple CPEs; and sending the ACL traffic information to the SDN controller, wherein the ACL traffic information is analyzed by the SDN controller according to a preset adjustment rule to find an egress link and traffic that need to be adjusted and control the DPE to adjust egress traffic.

7. The method according to claim 3, wherein after the sending the traffic adjustment policy to the SDN controller, the method further comprises:

sending, by the policy management device, VIP information to the traffic analysis device, and receiving information about an elephant flow and reported by the traffic analysis device, wherein the elephant flow is traffic, of first N Internet protocol (IP) network segments with maximum traffic, obtained by the traffic analysis device by filtering out VIP traffic flowing through an IP network segment of a network egress and indicated by the VIP information from a traffic statistics packet reported by the DPE, and then converging and sequencing remaining traffic in the traffic statistics packet according to destination prefixes, wherein N is a positive integer;

converting the information about the elephant flow into an access control list (ACL) statistics rule, and sending the ACL statistics rule to the SDN controller for generating an ACL policy for delivery to the DPE;

obtaining, by using the traffic analysis device, ACL traffic information that is obtained by the DPE through statistics collection according to the ACL policy, wherein the ACL traffic information comprises: information about ACL traffic that flows through the multiple egress links from the DPE to the multiple CPEs; and sending the ACL traffic information to the SDN controller, wherein the ACL traffic information is analyzed by the SDN controller according to a preset adjustment rule to find an egress link and traffic that need to be adjusted and control the DPE to adjust egress traffic.

8. The method according to claim 4, wherein after sending the traffic adjustment policy to the SDN controller, the method further comprises:

sending, by the policy management device, VIP information to the traffic analysis device, and receiving information about an elephant flow and reported by the traffic analysis device, wherein the elephant flow is traffic, of first N Internet protocol (IP) network segments with maximum traffic, obtained by the traffic analysis device by filtering out VIP traffic flowing through an IP network segment of a network egress and indicated by the VIP information from a traffic statistics packet reported by the DPE, and then converging and sequencing remaining traffic in the traffic statistics packet according to destination prefixes, wherein N is a positive integer;

converting the information about the elephant flow into an access control list (ACL) statistics rule, and sending the ACL statistics rule to the SDN controller for generating an ACL policy for delivery to the DPE;

obtaining, by using the traffic analysis device, ACL traffic information that is obtained by the DPE through statistics collection according to the ACL policy, wherein the ACL traffic information comprises: information about ACL traffic that flows through the multiple egress links from the DPE to the multiple CPEs; and sending the ACL traffic information to the SDN controller, wherein the ACL traffic information is analyzed by the SDN controller according to a preset adjustment rule to find an egress link and traffic that need to be adjusted and control the DPE to adjust egress traffic.

9. A method for performing balance adjustment on egress traffic of a software-defined networking (SDN)-based Internet data center (IDC) network, wherein the IDC network comprises: a data center provider edge (DPE), a traffic analysis device and an SDN controller that are connected to the DPE, a policy management device connected to the traffic analysis device and the SDN controller, wherein the DPE is connected to multiple core network provider edges (CPEs) in a public network by using multiple egress links, the method comprising:

receiving, by the SDN controller, group information of at least one autonomous system AS group sent by the policy management device, wherein each AS group in the at least one AS group comprises one or more ASs;

generating an AS filtering policy according to the group information and delivering the AS filtering policy to the DPE for collecting statistics to obtain AS traffic information, wherein the AS traffic information comprises: information about traffic of an AS group that flows through the multiple egress links from the DPE to the multiple CPEs;

receiving a traffic adjustment policy sent by the policy management device, wherein the traffic adjustment policy is generated by the policy management device after the policy management device obtains the AS traffic information by using the traffic analysis device, for instructing to adjust traffic of at least one destination AS group in the at least one AS group to at least one destination egress link in the multiple egress links; and controlling, according to the traffic adjustment policy, the DPE to adjust egress traffic.

10. The method according to claim 9, wherein after controlling, according to the traffic adjustment policy, the DPE to adjust egress traffic, the method further comprises:

receiving an ACL statistics rule sent by the policy management device, and generating an ACL policy and delivering the ACL policy to the DPE for collecting statistics to obtain ACL traffic information, and the ACL traffic information comprises: information about ACL traffic that flows through the multiple links from the DPE to the multiple CPEs; and obtaining, by using the traffic analysis device, ACL traffic information that is obtained by the DPE through statistics collection, and analyzing the ACL traffic information by using a preset adjustment rule, to find an egress link and traffic that need to be adjusted and control the DPE to adjust egress traffic.

11. A policy management device, used in a software-defined networking (SDN)-based Internet data center (IDC) network, the policy management device comprising:
a processor;
a non-transitory computer-readable storage medium storing a program to be executed by the processor, the program including instructions which, when executed by the processor, cause the policy management device to:
send group information of at least one autonomous system (AS) group to an SDN controller for generating an AS filtering policy for delivery to a data center provider edge (DPE), wherein each AS group in the at least one AS group comprises one or more ASs, obtain, by using the traffic analysis device, AS traffic information that is obtained by the DPE through statistics collection according to the AS filtering policy, wherein the AS traffic information comprises: information about traffic of an AS group that flows through multiple egress links from the DPE to the multiple core network provider edges (CPEs), generate a traffic adjustment policy according to the AS traffic information for instructing to adjust traffic of at least one destination AS group in the at least one AS group to at least one destination egress link in the multiple egress links, and send the traffic adjustment policy to the SDN controller for controlling the DPE to adjust egress traffic.

12. The policy management device according to claim 11, wherein the program including instructions, when executed by the processor, further causes the policy management device to:
display the AS traffic information to a system user;
receive, by using the receiving module, AS traffic adjustment information entered by the system user; and
convert the AS traffic adjustment information into the traffic adjustment policy.

13. The policy management device according to claim 11, wherein the program including instructions, when executed by the processor, further causes the policy management device to:
analyze the AS traffic information by using a preset policy rule, and generate the corresponding traffic adjustment policy.

14. The policy management device according to claim 13, wherein the program including instructions, when executed by the processor, further causes the policy management device to:
calculate link bandwidth utilizations of the multiple egress links according to the AS traffic information;
find an overloaded egress link whose link bandwidth utilization is greater than a first threshold that is set in the policy rule, and an underloaded egress link whose link bandwidth utilization is less than a second threshold that is set in the policy rule;
select traffic of a destination AS group from traffic of all AS groups on the overloaded egress link, and select a destination egress link from the underloaded egress link; and
generate the corresponding traffic adjustment policy for instructing to adjust the traffic of the destination AS group to the destination egress link.

15. The policy management device according to a claim 11, wherein the program including instructions, when executed by the processor, further causes the policy management device to:
send VIP information to the traffic analysis device, and receive information about an elephant flow and reported by the traffic analysis device, wherein the elephant flow is traffic, of first N Internet protocol (IP) network segments with maximum traffic, obtained by the traffic analysis device by filtering out VIP traffic flowing through an IP network segment of a network egress and indicated by the VIP information from a traffic statistics packet reported by the DPE, and then converging and sequencing remaining traffic in the traffic statistics packet according to destination prefixes, wherein N is a positive integer;
convert the information about the elephant flow into an access control list (ACL) statistics rule, and send the ACL statistics rule to the SDN controller for generating an ACL policy for delivery to the DPE;

obtain, by using the traffic analysis device, ACL traffic information that is obtained by the DPE through statistics collection according to the ACL policy, wherein the ACL traffic information comprises: information about ACL traffic that flows through the multiple egress links from the DPE to the multiple CPEs; and send the ACL traffic information to the SDN controller, wherein the ACL traffic information is analyzed by the SDN controller according to a preset adjustment rule to find an egress link and traffic that need to be adjusted and control the DPE to adjust egress traffic.

16. The policy management device according to claim 12, wherein the program including instructions, when executed by the processor, further causes the policy management device to:

send VIP information to the traffic analysis device, and receive information about an elephant flow and reported by the traffic analysis device, wherein the elephant flow is traffic, of first N Internet protocol (IP) network segments with maximum traffic, obtained by the traffic analysis device by filtering out VIP traffic flowing through an IP network segment of a network egress and indicated by the VIP information from a traffic statistics packet reported by the DPE, and then converging and sequencing remaining traffic in the traffic statistics packet according to destination prefixes, wherein N is a positive integer;

convert the information about the elephant flow into an access control list (ACL) statistics rule, and send the ACL statistics rule to the SDN controller for generating an ACL policy for delivery to the DPE;

obtain, by using the traffic analysis device, ACL traffic information that is obtained by the DPE through statistics collection according to the ACL policy, wherein the ACL traffic information comprises: information about ACL traffic that flows through the multiple egress links from the DPE to the multiple CPEs; and send the ACL traffic information to the SDN controller, wherein the ACL traffic information is analyzed by the SDN controller according to a preset adjustment rule to find an egress link and traffic that need to be adjusted and control the DPE to adjust egress traffic.

17. The policy management device according to claim 13, wherein the program including instructions, when executed by the processor, further causes the policy management device to:

send VIP information to the traffic analysis device, and receive information about an elephant flow and reported by the traffic analysis device, wherein the elephant flow is traffic, of first N Internet protocol (IP) network segments with maximum traffic, obtained by the traffic analysis device by filtering out VIP traffic flowing through an IP network segment of a network egress and indicated by the VIP information from a traffic statistics packet reported by the DPE, and then converging and sequencing remaining traffic in the traffic statistics packet according to destination prefixes, wherein N is a positive integer;

convert the information about the elephant flow into an access control list (ACL) statistics rule, and send the ACL statistics rule to the SDN controller for generating an ACL policy for delivery to the DPE;

obtain, by using the traffic analysis device, ACL traffic information that is obtained by the DPE through statistics collection according to the ACL policy, wherein the ACL traffic information comprises: information about ACL traffic that flows through the multiple egress links from the DPE to the multiple CPEs; and send the ACL traffic information to the SDN controller, wherein the ACL traffic information is analyzed by the SDN controller according to a preset adjustment rule to find an egress link and traffic that need to be adjusted and control the DPE to adjust egress traffic.

18. The policy management device according to claim 14, wherein the program including instructions, when executed by the processor, further causes the policy management device to:

send VIP information to the traffic analysis device, and receive information about an elephant flow and reported by the traffic analysis device, wherein the elephant flow is traffic, of first N Internet protocol (IP) network segments with maximum traffic, obtained by the traffic analysis device by filtering out VIP traffic flowing through an IP network segment of a network egress and indicated by the VIP information from a traffic statistics packet reported by the DPE, and then converging and sequencing remaining traffic in the traffic statistics packet according to destination prefixes, wherein N is a positive integer;

convert the information about the elephant flow into an access control list (ACL) statistics rule, and send the ACL statistics rule to the SDN controller for generating an ACL policy for delivery to the DPE;

obtain, by using the traffic analysis device, ACL traffic information that is obtained by the DPE through statistics collection according to the ACL policy, wherein the ACL traffic information comprises: information about ACL traffic that flows through the multiple egress links from the DPE to the multiple CPEs; and send the ACL traffic information to the SDN controller, wherein the ACL traffic information is analyzed by the SDN controller according to a preset adjustment rule to find an egress link and traffic that need to be adjusted and control the DPE to adjust egress traffic.

* * * * *